US007437384B2

(12) United States Patent
Sun et al.

(10) Patent No.: US 7,437,384 B2
(45) Date of Patent: Oct. 14, 2008

(54) REVIVIFIVATION DISPLAY METHOD FOR OUTLINE FONTS BASED ON STROKE CENTERLINES TECHNOLOGY

(75) Inventors: Haidong Sun, Shanghai (CN); Pingzhong Lu, Shanghai (CN)

(73) Assignee: Enmedia System Corp., Shanghai (CN)

( * ) Notice: Subject to any disclaimer, the term of this patent is extended or adjusted under 35 U.S.C. 154(b) by 0 days.

(21) Appl. No.: 10/509,142

(22) PCT Filed: Mar. 28, 2003

(86) PCT No.: PCT/CN03/00230

§ 371 (c)(1),
(2), (4) Date: Jun. 6, 2005

(87) PCT Pub. No.: WO03/083640

PCT Pub. Date: Oct. 9, 2003

(65) Prior Publication Data

US 2005/0234899 A1 Oct. 20, 2005

(30) Foreign Application Priority Data

Mar. 29, 2002 (CN) ............................... 02 1 03824

(51) Int. Cl.
*G06F 17/30* (2006.01)

(52) U.S. Cl. ..................... 707/104.1; 707/101; 707/102

(58) Field of Classification Search ................. 707/100, 707/101, 102, 104.1; 345/948, 956
See application file for complete search history.

(56) References Cited

U.S. PATENT DOCUMENTS

| | | | | |
|---|---|---|---|---|
| 6,288,725 | B1 * | 9/2001 | Fu | 345/467 |
| 6,577,314 | B1 * | 6/2003 | Yoshida et al. | 345/471 |
| 7,369,702 | B2 * | 5/2008 | Abdulkader et al. | 382/187 |
| 2006/0168639 | A1 * | 7/2006 | Gan et al. | 725/135 |

OTHER PUBLICATIONS

Derming, Juang et al., Resolving the unencoded character problem for chinese digital libraries, 2005, ACM Press, NY, NY, pp. 311-319.*
Xiang, Cao et al., “Modeling Human Performance of Pen Show”, ( Apr. 28, 2007), CHI Proc. Models of Mobile Interaction, San Josse, CA, pp. 1-10.□□.*

* cited by examiner

*Primary Examiner*—Diane Mizrahi
(74) *Attorney, Agent, or Firm*—Westman, Champlin & Kelly, P.A.

(57) ABSTRACT

A revivification display method specialized for outline fonts that based on Stroke Centerline Technology of self-defined data format, which can be applied to any operating system to enforce the function of multi-font Chinese and multi-language characters. Because the stroke is described based on the centerline, and stroke thickness parameter and curvature change parameter are introduced, the fonts are infinitely beautiful. The data share of stroke-composed components and component-composed characters makes small memory consumption of font database and revivification program, and so the process of revivification is very fast. The font generator integrated circuit (IC) product of this method can be embedded into CPU to make the system directly to be Chinese localized without any additional cost, so the IC product is especially suitable for embedded applications with very wide application prospect.

5 Claims, 20 Drawing Sheets

REVIVIFIVATION DISPLAY METHOD FOR OUTLINE FONTS BASED ON STROKE CENTERLINES TECHNOLOGY

CROSS-REFERENCE TO RELATED APPLICATION

This application is a Section 371 National Stage Application of International Application No. PCT/CN03/00230 filed Mar. 28, 2003 and published as WO 03/083640 on Oct. 9, 2003 not in English, the contents of which is hereby incorporated by reference in its entirety.

FIELD OF THE INVENTION

This invention relates to data processing, especially relates to the revivification display of data structure font library that could change the data to the data that the computer could process, this invention technology would be used in the Chinese character information processing by computer.

BACKGROUND OF THE INVENTION

The font library and the revivification display of characters are the important contents of the OS. Seeing as the number of the Chinese characters is big, the font library is the base of processing the Chinese information on OS. Using the font library, the Chinese characters could be displayed and imported.

There are three conventional font library technologies including bitmap font, vector font and outline font.

The advantages of bitmap font are that making and displaying of the bitmap font are easily, but it also has its disadvantages that it couldn't be magnified or reduced. That is the magnified and reduced effects are very poor. Besides when it was magnified the font capability would be square increased. Generally, an application need a plurality of fonts having various of sizes, its storage capability requirement is very huge. So that the bitmap fonts were used on the early OS or the embedded equipment that has lower requests on the characters display quality and number of characters.

The vector font library and the outline font library are popular on the OS at present, there are two types mostly, TrueType and Postscript. Now the most of PC Os use these two font libraries. The advantages are that these font technologies are mature, the font style is nice and it could be magnified and reduced, so that it can be used in the PCs. The disadvantages are that the structure of the font library is complex, the font revivification generator is complex, the effect of the small characters display is bad, the revivification speed of characters is slow, the capability of the font library is big and it could not meet the need of the embedded system. The font library technologies were both invented by America. We not only should pay much money, but also the development of our Chinese information processing would be baffled, it is abnormal that we are restricted on the Chinese characters font library technology area.

First of all, in the market there is no outline font library that could meet the need of the embedded system, because the memory capability of the embedded system is small. It will increase the cost while increase the memory capability. One typeface GB18030 of TrueType font takes 20 Mbyte storage space, and four typefaces take 80 Mbyte in total. At the present the advanced embedded system usually has only 16 Mbyte memory. The operating system itself cost some, applications need some, and the left is small and could not hold the huge outline Chinese font library. Many advanced PDAs and cell-phones could not be put in China market because they haven't been Chinese localized. As a result, they haven't found the way to meet the needs of the advanced Chinese embedded system.

SUMMARY OF THE INVENTION

The object of this invention is that the font style is nice at every size, the character could be magnified and reduced without restricted, the structure of the font library is legible, the font generator is used easily and the display speed is quick. Besides the font library capability is small so that it could meet the need of the embedded system. It is very necessary to invent a new font library technology.

In addition, we have to invent a new font that is formatted by our own country. This new font library technology should have self-property font style generator, it could be the country standard and it could be the technology barrier when the foreign company's put embedded products in our market. So it could protect our embedded Chinese information area keeping the top station.

The innovations and difficulties of this invention are that: create a new format and structure font library, this one would accord with the Chinese characters style characteristic and the capability of the font library is small. Our aim is to found the mathematics model to display the Chinese characters using the computer graphics theory and to found the interface that could be called by Chinese OS. According to the exterior data that was called by Chinese OS and combined with the formatted font library data, we could improve the precision and quality of the displaying of the Chinese characters. Then it could get the system support while displaying the characters, that will meet the need of all Chinese information processing, especially it will resolve the problem that the embedded equipment have small memory.

The first one of the innovations of this font library and font generator is the Stroke Centerlines. The conventional font library doesn't describe the Stroke Centerlines, it just describe the whole character outline curve. The Stroke Centerline technology creates the Stroke framework firstly, and then creates the outline based on the centerline. When a character is scaled, only the stroke centerline will change, and the stroke thickness is imported. The subsection of the stroke can describe the different font style. The curvature change could ensure that different size strokes in same kind could be approached. With that, the number of the strokes could be reduced. These all offer the conditions that we could found a structure font library and precise font generator. The capability of conventional font library is lager when they have a good font style. Our inventing technology could make the font library capability smallest with the nice font style, that is, can save 90 present of the memory capacity. It sounds impossible, but we realize it, because we invent the stroke centerline and the font library with new parameters and structures. Base on the new structure, we invent a new font library generator which could display the characters wonderfully on the computer screen.

The second innovation is that: the conventional TrueType font library could not display the small size Chinese characters well, so it have to embed bitmap font libraries having several sizes (for example: from 12×12 bit to 18×18 bit and so on), but this needs more memory capacity. Base on our new font library technology, our font library could display the small size character without embedding small size Bitmap font libraries.

The third innovation is that: the conventional font library technology needs several libraries with different thickness. But our new font technology don't need, we only need a single font library.

The fourth innovation is that: someone tried to use component to combine the whole Chinese character, but they lost. When the same component combines the different characters, the font style will become so bad, because the outline curve coordinate of the component is absolute, when magnifying or reducing the component, the thickness of component will lose the coherence. If the number of components increases, the font library capability will become bigger. Based on our stroke centerline, this problem will be resolved. The strokes have their own thickness, then the component thickness could be changed, the font style would be nice. We could make eligible product.

The invention realization is described as follows: we first found the new parameter and structure of the font library, then found a mathematics model, and realize this on the Windows OS using C language, then on the embedded OS UNLEUS and is solidified on the memory (testing). At last we all hope that it could be made into font library chip and font library explainer chip and solidified into the embedded CPU.

This font library is named as "Revivification display method specialized for outline fonts that based on Stroke Centerlines Technology". It will be called "ZGX" or "ZGX font library generator" for convenience.

ADVANTAGES OF THIS TECHNOLOGY

The advantages of this technology include: low memory cost while keeping the elegance appearance of characters. Usually, one-font standard GB18030 (includes 27590 Chinese characters and 1136 other characters, 28736 in all) will cost 1.1M bytes. Here Standard means every font has its own data file, has specialized parameters, components and strokes. This technology will only need one shared font-lib that takes 800 k bytes. Various fonts could share the same data somehow, Song will take 800 k, Fangsong, black and Kai only take 600 k each and thus in all 2600 k (2.6M). TTF will take more than 100M if 7 fonts are needed, in compare, only 4.5M will needed.

This technology is optimized, it could provide in focus characters. It only takes very few memories. It only takes 40 k bytes for codes and thus enjoys a high speed. It uses standard C language to program. The Core module uses integers and could be links to various OS. It could change size automatically and add a function to amend the thickness of the strokes that could not be available so far. That would be a crucial advantage for those embedded systems. So it has wide usage.

DETAIL DESCRIPTION OF THE PREFERRED EMBODIMENTS

Figure 1:
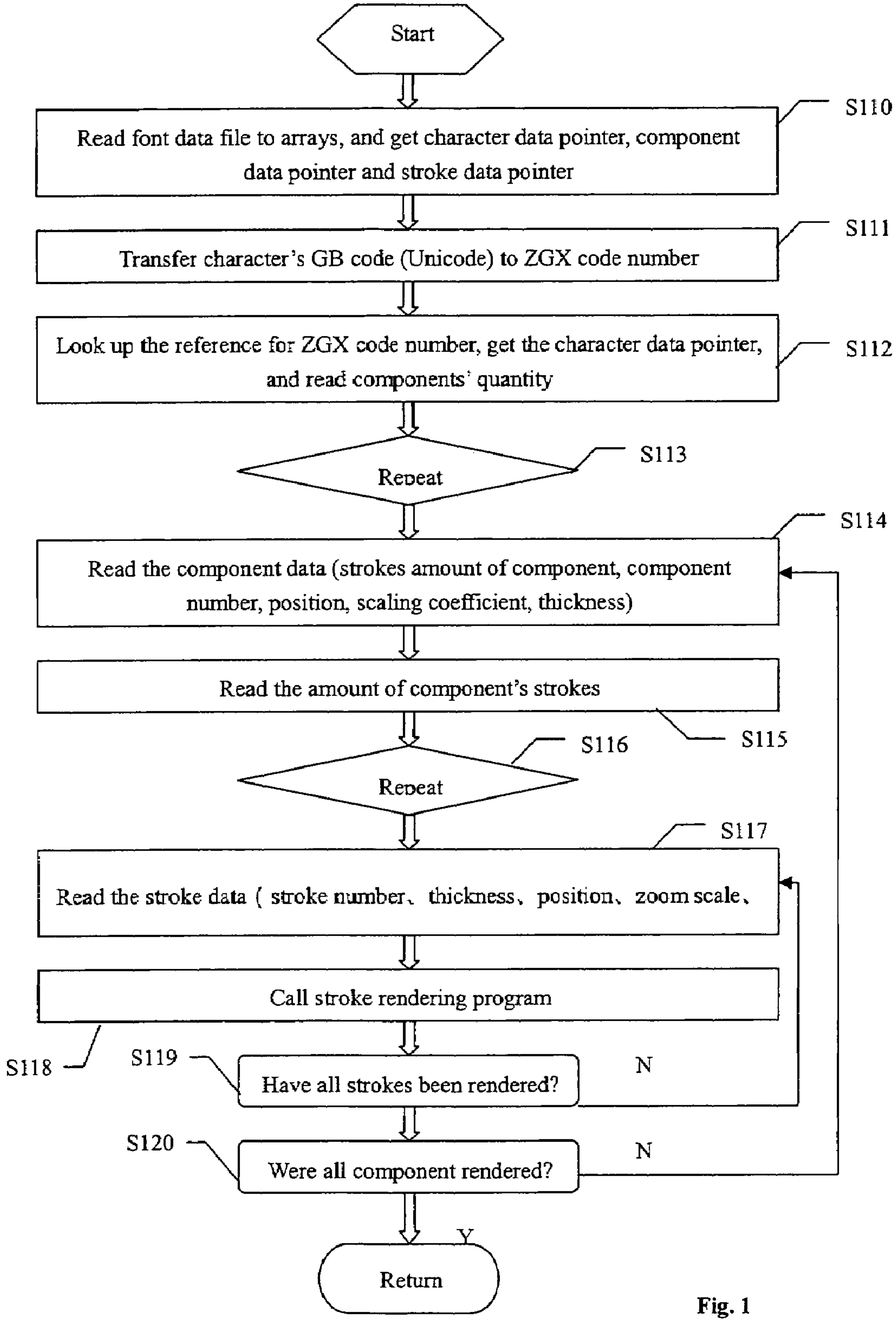
FIG. 1 is a flow chart of main module.

To illustrate the operation process with FIGS. 1-32: FIGS. 1-14 show the flowing charts of all modules consisting of generator. Every module shows how this technology handles with font generation by the algorithm invented according to computer graphic theories. FIGS. 15-28 show all data files and data formats needed for the technical solution of the invention and FIGS. 29-32 show various coordinates for generating the space by which the data is transformed.

1. Summary

This technology is used for character information processing. It defines a curved outlines font lib data structure. This data structure includes strokes and component data and thus the best characters are generated with generator. It is characterized in that: the lowest memory cost while keeping its elegance. Usually, one-font standard GB18030 (includes 27590 Chinese characters and 1136 other characters, 28726 in all) will cost 1.1M bytes. Here Standard means every font has its own data file, has specialized parameters, components and strokes. This technology will only need one shared font-lib that takes 800 k bytes. Various fonts could share the same data somehow, Song will take 800 k, Fangsong, black and Kai only take 600 k each and thus in all 2600 k (2.6M). TTF will take more than 100M if 7 fonts are needed, in compare, only 4.5M will needed. That would be a crucial technology for embedded system, which has limited memory resources. So it has wide usage.

1.1. Strokes of ZGX Font Libraries

ZGX font lib strokes are the basic elements to form characters. Different strokes are represented by different stroke index. The strokes can be classified as Heng, Shu, Pie, Na, Dian that could be further divided to over 30 groups. In ZGX, over 1000 strokes shall be made. Strokes include Centerlines, constructions and outlines. The outlines will form a closed curve.

The Centerlines are skeletons of the character. It includes control dots for all strokes and consists of beelines and Bezier lines. Strokes include head, body, inflexion and tail. Every part has control dots as reference to describe its outlines. Outlines also consist of beelines and Bezier lines. The stroke sect index indicates its formal index, from 0 to max. The stroke curvature indicates that in the head or tail, some control dots' positions are changed. It has 15 modes from mode 1 to mode 15. The curvature change segment number and the curvature change mode will be given in the index file of stroke library.

The descriptions for stroke centerlines and revivification display generator are shown in FIGS. 5-14.

Every font has its own stroke lib.

1.2. ZGX Font Lib Components

ZGX font lib components are formed with some strokes. It could be classified as 1-stroke component, 2-stroke component, 3-stroke component . . . and the maximum is 31-stroke component. The components are represented by the amount of strokes of component (how many strokes the component has) and their own index number, and such data could be shared around variety-font products.

The strokes forming components have parameters of strokes number, thickness coefficient, center coordinates in x direction and y direction under component coordinate system, scaling coefficients in x direction and y direction and curvature diversification in x direction and y direction.

The stroke number could be shared in various font lib products as common data.

Coordinates for stroke center under component coordinate system are limited from −128 to 127. It is defined when customizing font lib products, and represented in one byte.

The thickness coefficient works on outlines of strokes, it will make strokes thick or thin. It could make effect on special section and decorates the fonts.

Scaling coefficient in x direction and y direction will only work on control points within centerlines. It will not change the thickness so that the consistency in the thickness of the stroke will be ensured. Scaling coefficient is defined when customizing font lib products, takes a value from 0 to 255 and be saved in one byte also. Wherein 128 denotes double zooming. In compact mode, it could be defined in 6 bits and thus has a limitation from 32-95, the saving format is that the number above described subtracts number 32, that is it is saved as 0 to 63. Whereas 64 denotes double zooming in compact mode.

Curvature diversification in x coordinate and y coordinate means changes in head, tail or some common section. It has 15 modes to work on a single section or 2 sections. (at most 2 sections.) For examples, x coordinates in head and y coordinates in tail is one mode, and x coordinates in common section and y coordinates in it is another mode. The premier will solve compound stroke (such as hengzhe) problem and the ratio problem of heng section and zhe section, and the latter one solve the problem that the same stroke in different component has different curvature diversification. This parameter will make ZGX fonts precisely same as any font templates, so that the precise and beautifulness of the character in font library will be ensured. Each curvature change increment is between −128 and 127, and is expressed with one byte. In the compact font format, the curvature change increment can be expressed with six bits format, because the curvature change increment is usually small.

1.3. Characters of ZGX Font Library

ZGX font library is expressed with numbers, which can be from 1 to N (N is a long integer), so the amount of the characters is no limited and the font library can be super large. ZGX font library can be ordered according to both Unicode standard and Chinese standard (such as GB2312, GBK and GB18030).

The character of ZGX font library can be formed by several components, also several strokes directly. The former is called component-composed character, while the later is called stroke-composed character.

Stroke-composed character means that the character is formed by several strokes, whose parameters data include: the number of each stroke composing the character, the thickness of each stroke, the coordinates of each stroke center in the character coordinate system, the scaling coefficients of each stroke in X direction and Y direction, and the curvature change increments of each stroke in X direction and Y direction. The explanation of each parameter of stroke-composed character is the same with the description of components of ZGX font library in section 1.2.

Component-composed character means that the character is formed by several components, whose parameters data include: the amount of strokes of each component (how many strokes the component has), the number of each component, the coordinates of each component center under the character coordinate system, the scaling coefficients of each component in X direction and Y direction, and the thickness coefficient of each component. Components are composed of strokes, as explained in section 1.2.

The amounts of each component's strokes (how many strokes the component has) and the numbers of the components are the data that can be shared in multi-font library products. It is only needed to be in the font file of one typeface.

The coordinates of each component center under the character coordinate system are decided according to the structure position number. There are 31 kinds of structure position numbers, such as left-right structure, up-down structure, surround structure etc., which are determined when font library product is customized.

The scaling coefficients of component in X and Y directions are limited between 0 and 255, and each is expressed by one byte. In compact format, 0 to 63 represents 32 to 95 respectively. Each scaling coefficient is expressed by six bits, and the scaling coefficient "64" means double.

1.4. Extern Called Parameters for Generating Character

When a character is generated in the device coordinate system, the parameters used are font number of the character, Chinese standard code (or Unicode standard) of the character, length of the character (unit: pixel), width of the character (unit: pixel), thickness coefficient of the character, foreground color of the character, display mode of the character (such as rotation, bold, oblique, fill etc.), and the bitmap data of the character returning from the buffer.

In principle, the extern called parameters has no limit on the length, width and thickness of the character. This means that one kind of typeface can be any length, width and thickness, so the character can be long or short, bold or thin, also one typeface character may be used as many kinds of typefaces.

1.5. Technical Specification of ZGX Font Library

Under the premise of ensuring preciseness and beautifulness of characters, ZGX characters can save storage and accelerate the display speed mostly.

Standard format means that every font has its independent data files, i.e. different parameter library, component library and stroke library. Compact format means there is a kind of compact expression for data. For example, the parameter originally expressed by 8 bit now is expressed by 6 bit. Multi-font share means that a part of multi-font data is the same to be the shared.

The standard format GB18030 font library (27590 Chinese characters and 1136 non-Chinese characters, 28726 codes together) of one font is 1.1 MByte (while TrueType font library is over 15 Mbyte). The compact format GB18030 font library of Songti typeface is 800 KByte, and the compact format GB18030 font library of Fangsong, Heiti, Kaiti typeface is respectively 600 Kbyte. Compact format GB18030 font library of four typefaces is 2.6 MByte together, and font library of seven typefaces is 4.5 MByte together.

The revivification algorithm of ZGX font library is more excellent than that of TrueType font library, because the filling process of the former is aimed at each stroke while not the whole character, so the filling speed of ZGX is faster. Additionally, the index of ZGX is simple and direct, and all the math operations are integer operation with overall optimization.

1.6 Detail Description of Revivification Display on Computer by Character Library Parameter Hereinafter, the contents in (1) to (5) are description of outline data library, that is, the description of stroke library, stroke-constructed character parameter library, component library, component-constructed character parameter library, character parameter library for multi-font shared format component, and data format. The contents in (6) to (9) are the steps of revivification display on a computer by strokes, stroke-constructed character, stroke-constructed component, component-constructed character. The contents in (10) to (12) are the steps of interface implementing of the font display on computer.

(1) A font library based on the stroke centerline, each font styles have different stroke libraries. The structure of the stroke library is shown in FIGS. 15-18; every stroke is divided into several segments according to its shape: head, body, corner and tail. There are several bodies and corners in one stroke, the segments are described in lines or Bezier curves. The key points of the segment are the control points of the segments. The relative locations of segments based on the control points describe the coordinates of the outline curve. The control points are the start point and end point of the line, and also they are the start point, outside point and end point of the Bezier curve. The length of the stroke data is not equal to each other. The tail of the stroke ends the stroke.

The data structure of the stroke library is that: the total number of the stroke holds two bytes;

The structure of the head of the stroke is that: the length of the data is equal to the number of the total stroke number multiplying 4. Every stroke holds 4 bytes, the first 3 bytes are the location index of the stroke, the last 4 bits of the last bytes describes the curvature change and the front 4 bits describes the number of the segment that could be curve changed.

The data of the stroke: the data of the stroke centerline and the outline curve data.

Different font style have different stroke library, there are 1000 strokes in the stroke library, the data length of the strokes from 20 bytes to 100 bytes.

Figure 20:
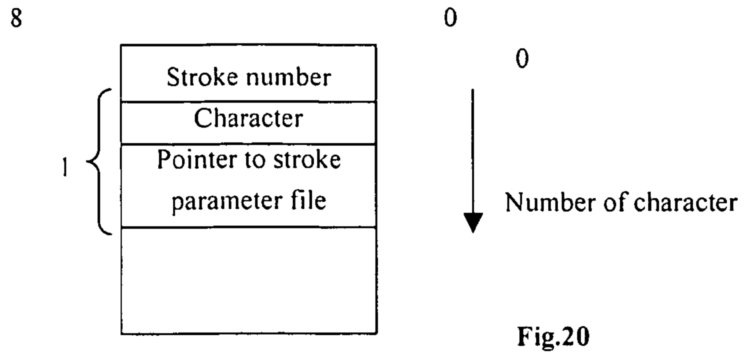
FIG. 20 shows data format of data file of stroke-composed characters.
Figure 21:
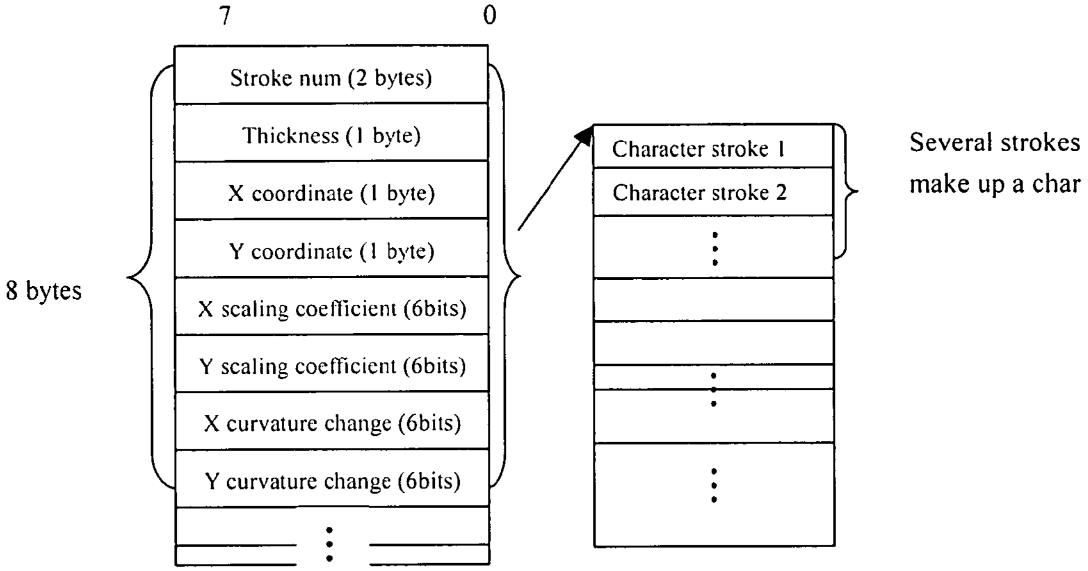
FIG. 21 shows data format of stroke structure parameters.

(2) A font library that is directly constructed by strokes, each font style has different stroke libraries (see FIGS. 20-21). The structure of the data is:

The relative location of the stroke data holds 4 bytes;

The amount of the all characters: 4 bytes;

The index of the characters: the length of the data is equal to the number of character number multiplying 4, and every character holds 4 bytes, the first byte describes the number of its strokes which make up of the character, the next 3 bytes describe the character location.

The parameter data: the length is equal to the product of 8 multiplying number of the strokes that make up of the characters, every stoke parameter holds 8 bytes, they are the number of the stroke (2 bytes), the thickness (1 byte), stroke location (2 bytes), scaling coefficient (12 bits) and curvature change increment (12 bits); The stroke library: as we have mentioned above in (1).

(3). A Chinese component library which are constructed by strokes, each font style has different component libraries (see FIG. 19), the structure is that: The maximum number of the strokes which make up of the components: the total component number (see FIG. 19), holds 4 bytes, ranges from 20 to 29, namely the maximum number of the strokes which make up of the components ranges from 20 to 29, the arrangement of the components is that: 2-stroke component, 3-stroke component and till to n-stroke component.

The index table of n-stroke components: holds 4*n bytes (n is the maximum number of the strokes which make up of the component), every location number of strokes components holds 4 bytes, that is: the location index of 2-stroke component, the location index of 3-stroke component and till to the location index of n-stroke component, the components which are made up by same amounts of strokes have some, from the number 1 to the maximum number, the components which are made up by 2 strokes hold 2*8 bytes, the components which are made up by 3 strokes hold 3*8 bytes.

The component index data: 8 multiplying the number of the bytes which make up of the component, every stroke index data hold 8 bytes, that is: the stroke number which holds 2 bytes, the thickness coefficient which hold 1 byte, the stroke location which holds 2 bytes, the stroke scaling coefficient which holds 12 bits and the stroke curvature change increment which holds 12 bits.

(4) A font library made up of components and its generator, which are shown in FIGS. 22-25, each font styles has different parameter data libraries, its data format is that:

Version information: 4 bytes, the front 2 bytes is the name of corporation, the third byte is the symbol of the font style and the last byte is the symbol of the characters sets.

The start location of the character parameter: 4 bytes;

The start location of the component parameter: 4 bytes;

The start location of the stroke parameter: 4 bytes;

The character index data table: (n+1)*4 bytes, the first 4 bytes is the total number, the next 4*n bytes is the index of every characters, the front 3 bytes is the character location, the last 1 byte is the component number which make up to the character. The character parameter data is that: the component number make up of the character holds 6 bytes, they are that: the component number which holds 11 bits, the strokes number make up of the component holds 5 bits, the component location holds 2 bytes, the component scaling coefficient holds 12 bits and the thickness coefficient holds 6 bits; the component parameter data: see (3); the stroke parameter data: see (1).

Figure 26:
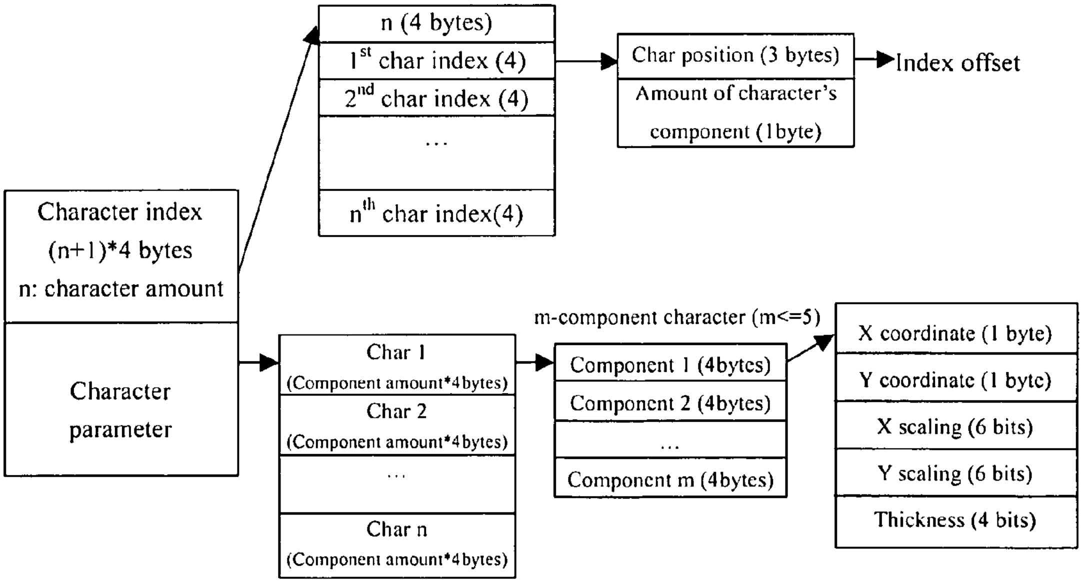
FIG. 26 shows character parameters data format of part shared component-composed characters.
Figure 27:
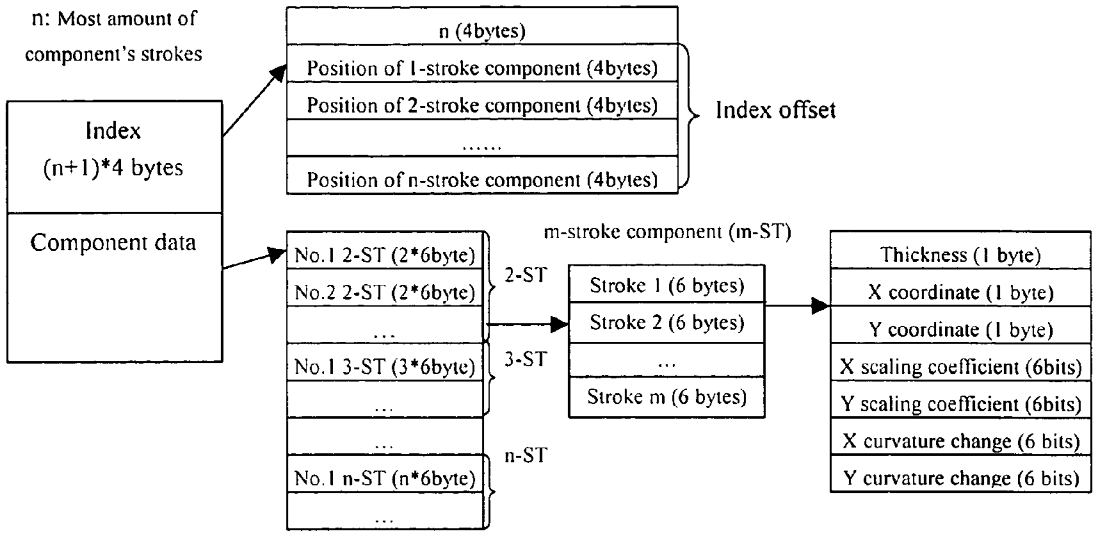
FIG. 27 shows component parameters data format of part shared component-composed characters.
Figure 28:
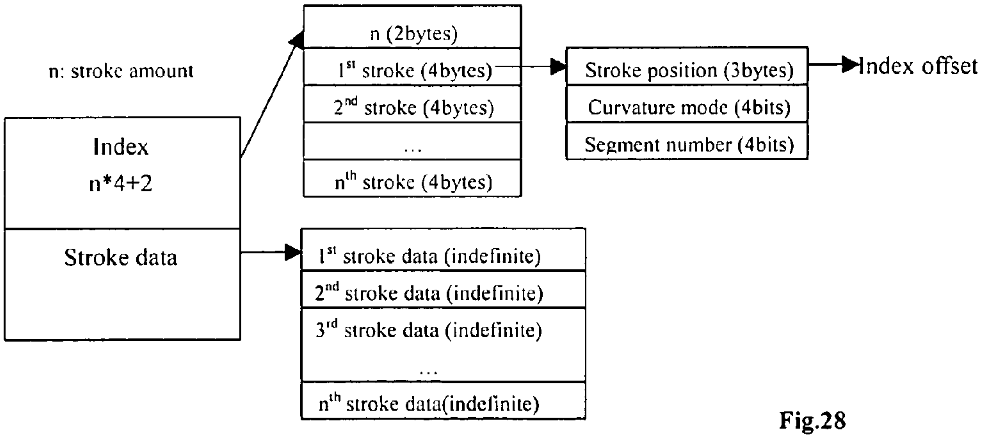
FIG. 28 shows stroke parameters data format of part shared component-composed characters.

(5) A several font style share structure library, each font style library has the same component number and the same stroke number, these data are described in a basic font and shared by other font, the data structure is that:

The structure of the basic font has been described in (4);

The other font styles structure is that: see FIGS. 26-28;

The start location of the character parameter: 4 bytes;

The start location of the component parameter: 4 bytes;

The start location of the stroke parameter: 4 bytes;

The character index data table: 4*(n+1) bytes (n is the total character number), the first 4 bytes denotes the total number, the next 4*n bytes denotes the index of every characters, the first 3 bytes denotes the character location, the last 1 byte denotes the component number which make up of the character.

The character parameter data is that: the component number make up of the character holds 4 bytes, they are the component parameter which holds 4 bytes, the component location holds 2 bytes, the component scaling coefficient holds 12 bits and the thickness coefficient holds 4 bits;

The component parameter data: see (3), while the stroke number is deleted; The stroke library: see (1).

(6) A Stroke centerline technology and method of displaying stroke graph at high resolution in the compute screen coordinate system, see FIGS. 5-14, FIGS. 15-18 and FIGS. 29-32, they are the key and base of the font library which made up by strokes, whether the font library made up by strokes or the font library made up by components, the technology will be boil down to how to display the stroke outline on the computer screen. In order to explain the theory, we would display a character constructed by components at the computer screen coordinate, the mathematics formula is shown in (6) of section 3.1.

The process of displaying one stroke on the computer screen from the font library constructed by components is that:

Firstly, read the parameterized reference stroke data from parameterized stroke library, i.e. the data of drawing centerline segments and outline segments. These data are the coordinates relative to the stroke coordinate system.

Because Chinese character's components are composed of strokes, the second step is to transform coordinates of points on strokes from stroke coordinate system into component coordinate system, combine with component and call extern called parameters for data processing at the same time.

The Chinese character is composed of several components. Each component has different size and position. The third step is to transform coordinates of composed strokes from component coordinate system into character coordinate system, combine with character and call extern called parameters of the strokes belonging to the component for data processing.

Every stroke of Chinese characters will be displayed on computer screen in the end. The fourth step is to transform coordinates of each point of composed strokes from character coordinate system into compute screen coordinate system, and combine with extern called parameters for data processing. These extern called parameters are character's length, width, scaling coefficients, coordinates of character center in screen coordinate system, foreground and background colors for character displaying, and memory array pointer of font's bitmap.

Through the data processing and coordinates transform above described, the coordinates of points on stroke centerline segment in screen coordinate system have been gained. Firstly every segment of stroke centerline has been drawn. If the segment has curvature change, then curvature change increment will be added to the corresponding point. And then centerline segments are drawn with lines or Bezier curves according to segment signs. The drawing of lines or Bezier curves use known algorithms. After drawing all segments, the skeleton line of stroke centerline has been done. Reference to the control points of centerline segments, combining with stroke thickness parameter and curvature parameters of all segments, the coordinates of points of the first outline segments in screen coordinate system can be computed by clockwise from head to tail, and all segments of the first outline of the stroke can be drawn. Then draw the segments of the second outline from tail to head. Coordinates of each outline segment are relative to the corresponding control points of centerline. These relative coordinates multiply thickness coefficients, the extern called parameters, and plus coordinates of corresponding control points of centerline. The results are the coordinates of each outline segment in screen coordinate system. Then outline segments are drawn with lines or Bezier curves according to each segment's signs and drawing mode. After these segments have been drawn, the outline of the stroke is completed. Two outlines form a closed area. Filling this area with known filling algorithms, a stroke of a Chinese character has been displayed. Based on the centerline technology, every stroke would be described precisely, while magnifying and reducing one stroke, it will only act on the centerline control points, and outline will change under the centerline. The change of the character thickness won't change the stroke thickness. That will keep the consistency of strokes thickness of the characters. The thickness parameters only act on the stroke outline. Thus this will realize all kinds of thickness of font styles, especially the thickness is zero, namely only the centerline is drawn. The stroke that only has centerline is nice. The thickness parameters also act on the especial segments, which will keep the font style precise. The curvature parameter could make the font style to match the character models completely. The character models were written by the excellent experts in our country. Our font styles accord with the country character standard. There are 27500 Chinese characters in GB18030, 320000 strokes. We only need 1000 strokes to create our stroke library, based on the parameters we could match the 1000 strokes to the 320000 strokes with different styles, different sizes and different thickness.

Figure 4:
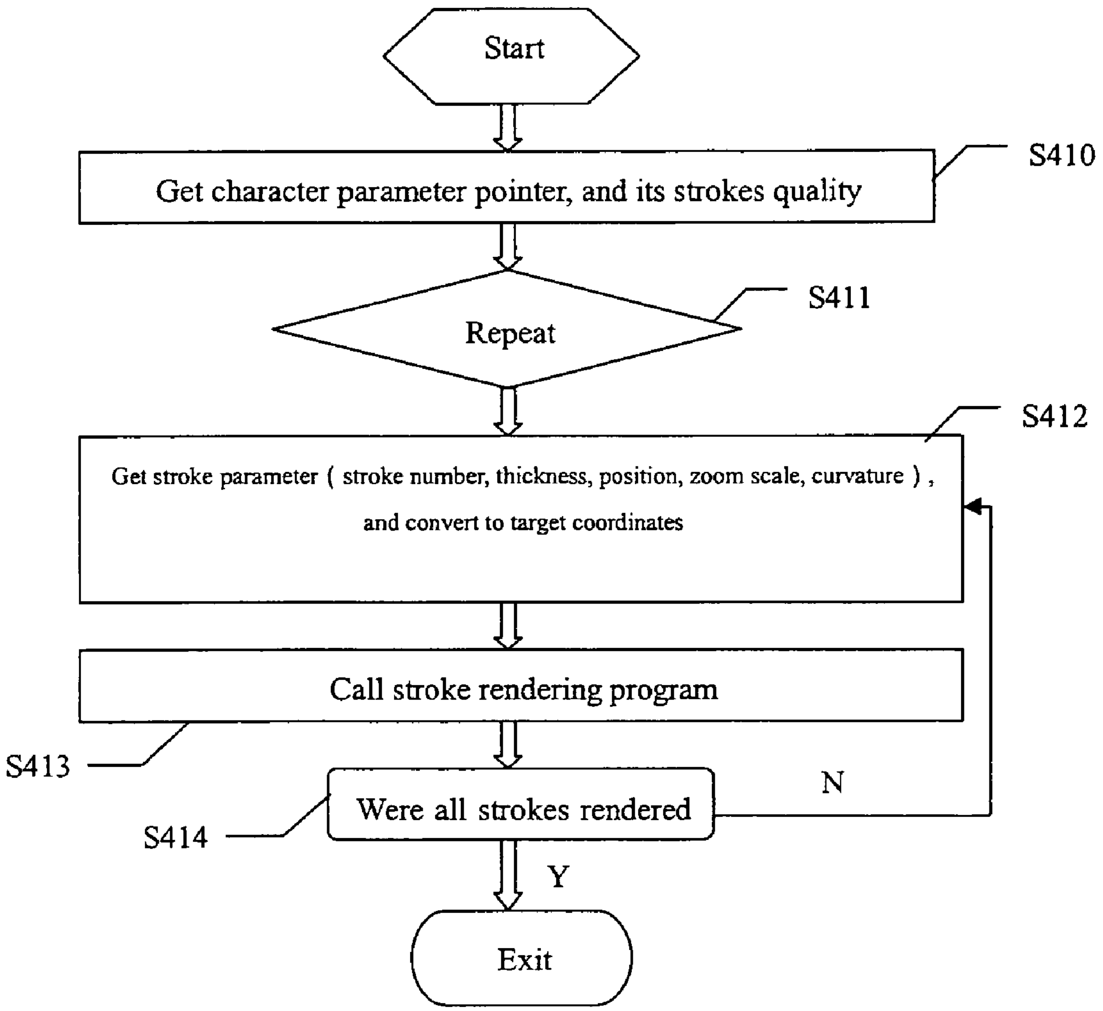
FIG. 4 is a flow chart of drawing strokes according to ZGX characters' numbers.

(7) A method of displaying the character constructed by strokes, comprising: see section 4, FIG. 4, FIG. 20 and FIG. 21, Firstly, get the extern called character code, extern called parameters in character revivification array, such as character thickness, character width, character length, character displaying color or grayscale and character display mode. Font size of corresponding font can be got according to the character code index. The amount of components and parameters of each component are read from component-composed font file according to the font size. The parameters of each component are the amount of a component's strokes, component number, coordinates of component center, component scaling coefficients and component thickness coefficients. Every component is displayed after coordinates transforming and date process computing according to the extern called parameters and parameters of every component. For all components of the character, repeat doing according to steps of (6) till all the components are generated on the screen.

Figure 19:
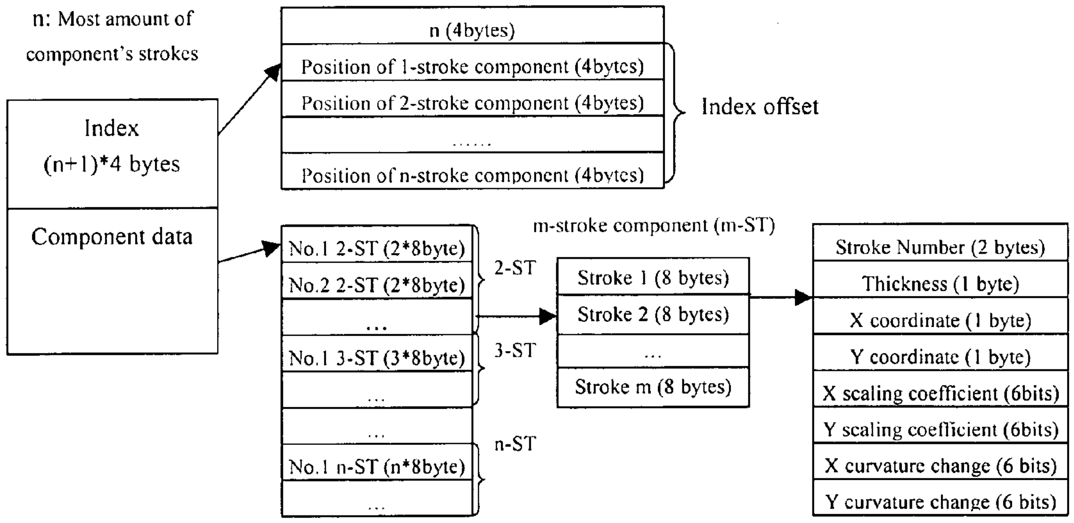
FIG. 19 shows file data format of components data.

(8) A method of displaying the component constructed by strokes, comprising: see section 4.3, FIG. 19 and FIG. 4. Firstly read the extern called parameters of the character, the parameters include the amount of the component's strokes, the component number, component position, component scaling coefficients, and component thickness. According the component number and this type component index, we could get the strokes data that make up of the component. These stroke parameter data include the stroke number, the stroke thickness coefficient, the stroke location, the stroke scaling coefficient, the stroke curvature change increment, according the coordinate change of the components extern called parameters and the strokes parameters, we could display the every strokes of the components on the screen. When we displayed all the strokes of the character according to steps of (6), we finished the display of the character. There are 27500 Chinese characters in GB18030 standard, and these characters need 5000 components with their parameters.

(9) A method of displaying the characters constructed by components, comprising: see section 4.3, FIG. 1 and FIGS. 22-25, firstly accord to the character coding and the thickness of the characters, the width of the character, the display color, the display mode and the extern called parameters, and the character code index, we could get the data from the font library, the data include the numbers of the components, the components numbers, the components coordinates, the components scaling coefficients and the components thickness. According the coordinate change of the components' extern called parameters and the character parameters, we could display the every component of the characters on the screen according to steps of (8). When we displayed all the strokes of the character, we finished the display of the character. This font library includes 1000 strokes and 5000 components, these components with their parameters made up of 27000 Chinese characters in GB18030, also these components and strokes could make up of all kinds of font style libraries.

(10) A revivification method of High-precision Chinese described by Stroke Centerlines: the method could be applied on various Operation Systems. It is firstly realized on WINDOWS OS in PCs by using standard C language and thus been transplanted to embedded system-NUCLEUS by solidified to memories. Font-lib chips or character Revivification Display chips could be produced by this and then solidified to CPU or embedded OS. The steps for generating high resolving curves by using all kinds of revivification methods have been described in (6)-(9).

(11) An interface for calling Chinese character revivification display by application: also see section 4: ZGX font-lib interface module. The module are consists of 3 sub modules. One init module, also see section 4.2 and FIG. 2; One revivification display module, also see section 4.3 and One display device to show character strings, also see section 4.4.

The inputs for init module include: font number that represents Song, Fangsong, Kai and Black in GB18030, both component formed fonts and stroke formed fonts. Even Korean fonts, Japanese fonts or western fonts could be operated. It could handle SBC case and UNICODE/GB2312 cases.

The outputs will return a pointer to arrays. That is the data for all fonts, all components and all strokes. The pointer could be used for revivification display module. Such module will read outer parameters into memory arrays—if such data are solidify into memories before, they will be seen as constants—those pointer could be read into modules to use and thus ignore the init module.

Inputs for Chinese character revivification display module include: standard code for Chinese characters, Unicode index, font number, out parameters array, return parameter type and pointers to outputs.

Outputs return to computer include: revivification display data according to return type, usually the bitmap data for Chinese characters, a high-speed copied output for such fonts.

Figure 5:
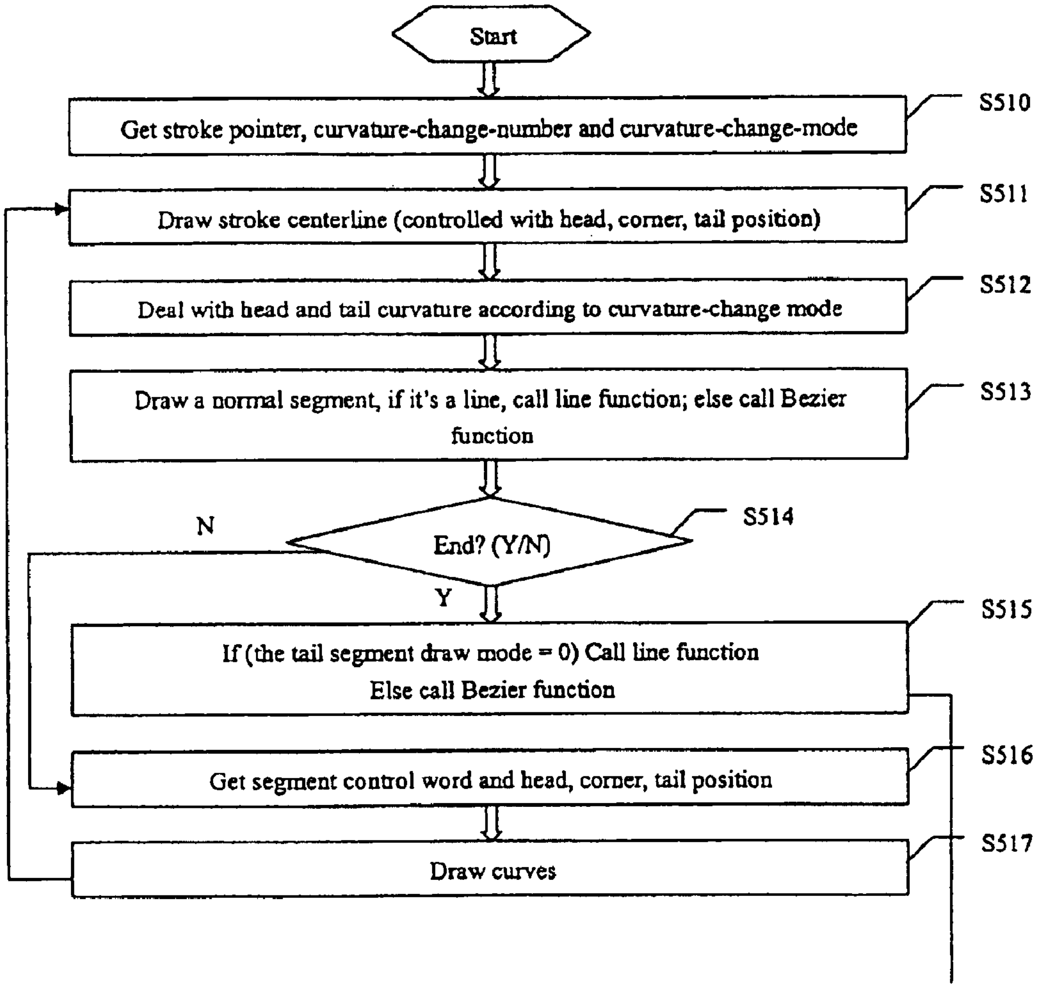
FIG. 5 is a flow chart of Stroke generator.
Figure 5:
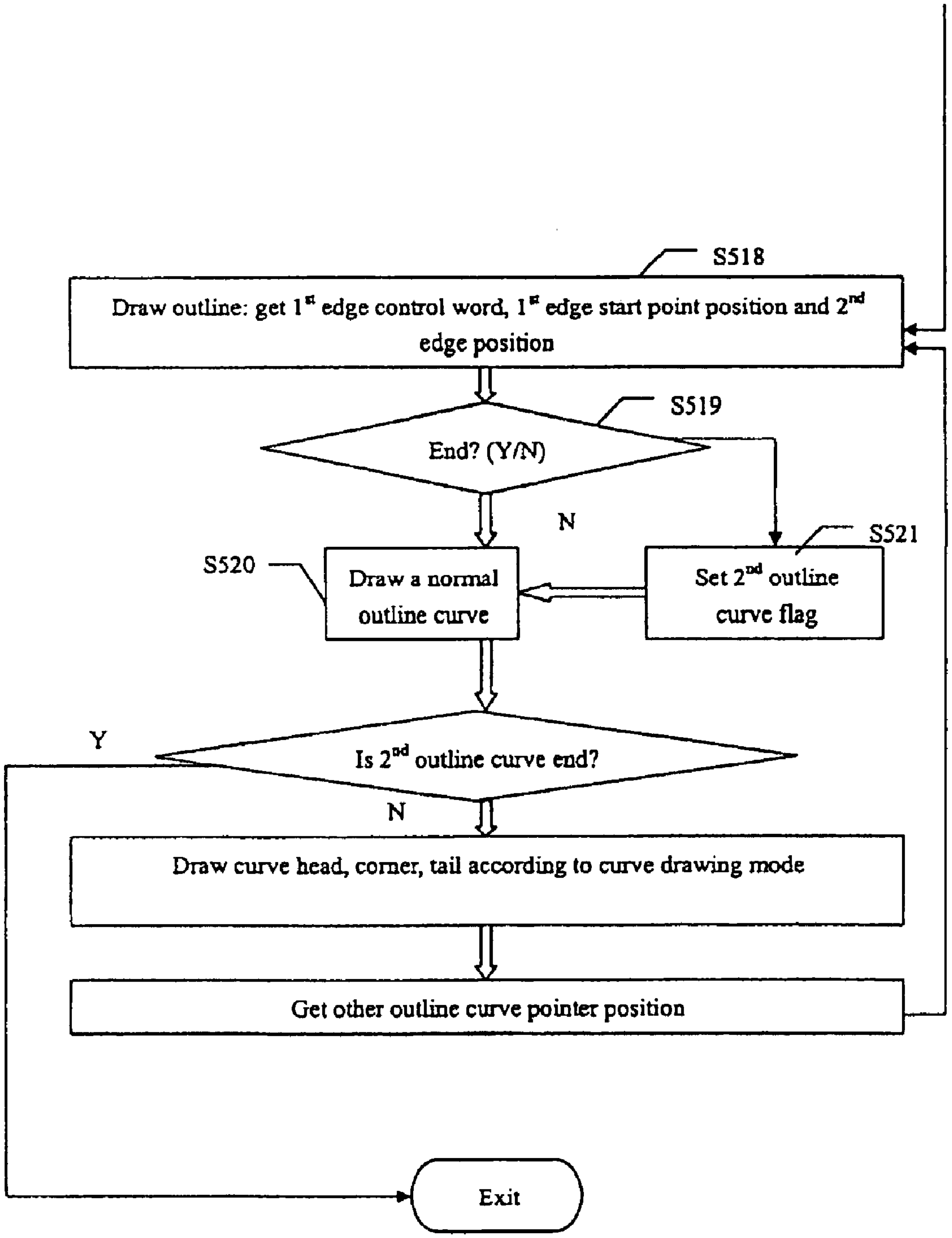

The interface will call component from modules (see FIG. 1 and the (9) above described), direct stroke form module (see FIG. 4 and the (7) above described), stroke component sub module (see FIG. 4 and the (8) above described), stroke draw module (see FIG. 5 and the (6) above described) and those parameters obtained from init module.

(12) A device for displaying Chinese strings: see section 4.4. The input is a string, its position is located at up-left corner of the screen, its parameter array (Which has been described in section 4.1, includes outer parameters, width and size, etc)

The outputs are a string showing on screen according to the extern called parameters.

It will be realized by interfaces described in section 4.3.

2. Data Format of ZGX Font Library 2.1. Data File of Strokes (See FIG. 15)

Figure 16:
FIG. 16 shows data format of parameterized strokes.

Data format of strokes (see FIG. 16).

Figure 17:
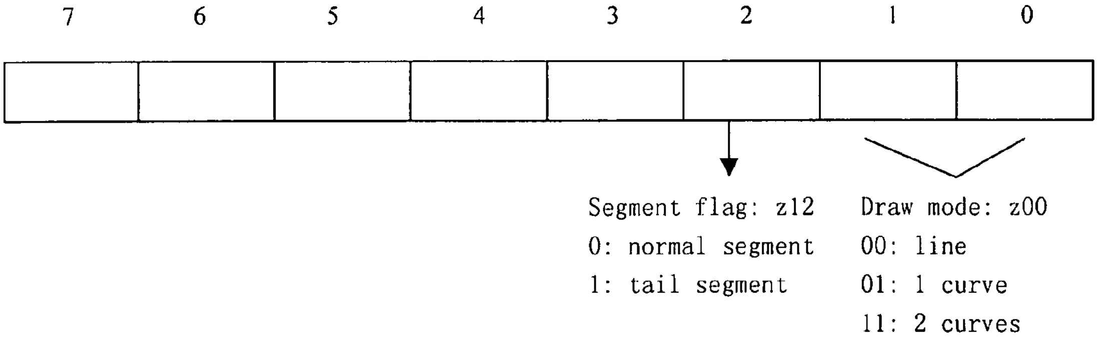
FIG. 17 shows control word format of stroke centerline.

The data format of control word for each stroke center-line segment is represented in one byte. The definition of every bit of the control word is shown in FIG. 17.

Data of the stroke center-line segments include: head coordinates (2 Byte), control word of segment (1 Byte), body data (2*z00 Byte), and tail control word.

Figure 18:
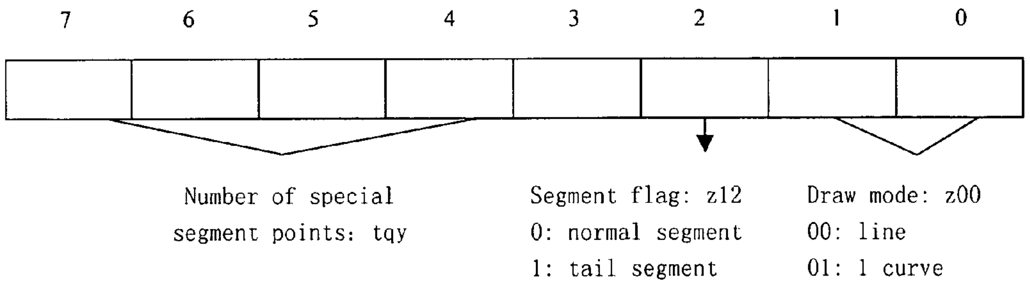
FIG. 18 shows control word format of stroke outline.

Data of the stroke outline segments include: control data format of each segment represented in 1 Byte, the definition of every bit of the word is explained below (see FIG. 18).

Data format of stroke outline segment: segment control word (1 Byte), coordinates increment of 1st edge outline (2 Byte), coordinates increment of 2nd edge outline (2 Byte), other points coordinates of the head (2×tqy Byte), body data (4×z00 Byte, including points on 1st and 2nd edge outline); corner control word (1 Byte), 1st outline coordinates increment (2 Byte), 2nd outline coordinates increment (2 Byte), other points coordinates of the corner (2×tqy Byte), body data (4×z00 Byte, including coordinates of points on 1st and 2nd outline); tail control word, other points coordinates of the tail (2×tqy Byte).

2.2. Data File of Components

Please see FIG. 19.

2.3. Data File of Stroke-Composed Characters

The first four bytes is the start position of stroke data (with regard to head file).

The next four bytes is the total number of Chinese characters.

Then, the index data of every Chinese character takes four bytes orderly, where the first one byte is the stroke amount of the character, and the next three bytes are the position of the stroke data in the stroke parameter file (see FIG. 20).

The length of the data block is the product of 4 multiplying the total number of Chinese character.

The following data block is the stroke structure parameters: every stroke takes 8 bytes, where the first two bytes is the stroke number, the third byte is the thickness of the stroke, the next five bytes are the X, Y, SX, SY, QX, QY of the stroke (see FIG. 21).

Figure 15:
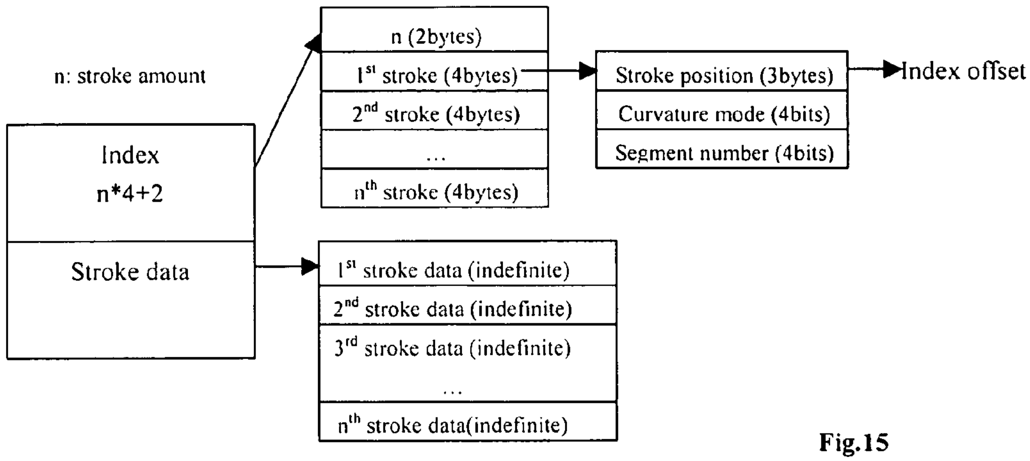
FIG. 15 shows file data format of parameterized strokes.

The storage of the data block is: amount of all Chinese characters' strokes*8 bytes;

Next, it is the stroke generating data block. It is composed of:

The amount of strokes: 2 bytes;

The index of stroke data: 4*amount of strokes, stroke data (FIG. 15 is the compact format of stroke data file).

2.4. Data Format of Component-Composed Characters

Basic font file is mainly composed of several parts: index table, character parameter data, component parameter data and stroke data. Index table (see FIG. 22)

Figure 23:
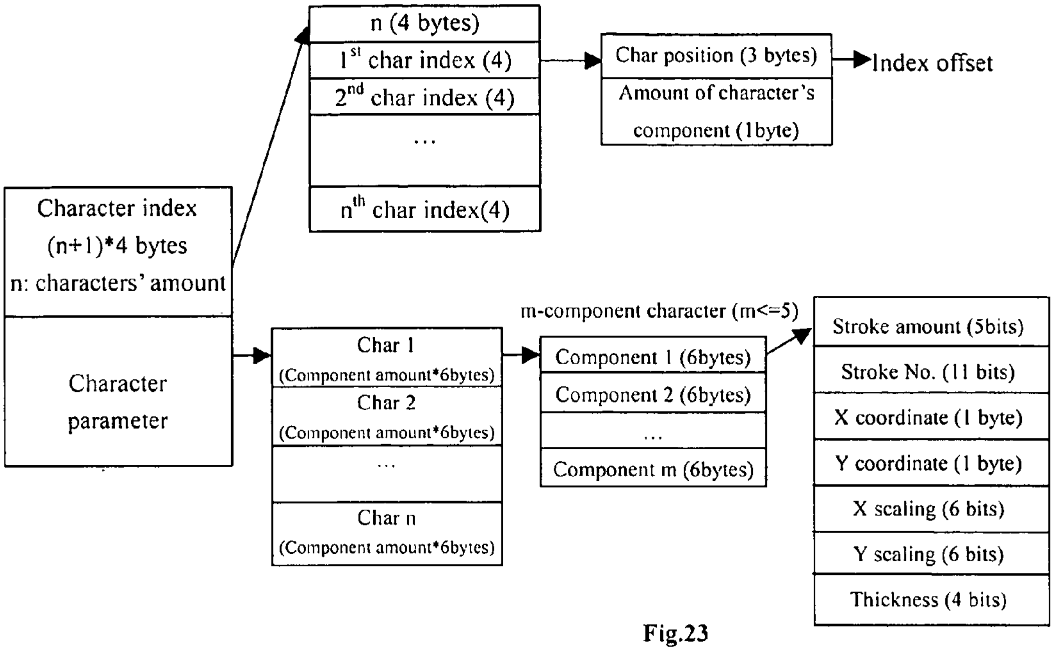
FIG. 23 shows character parameters data format of Component-composed characters.

Character parameter data (see FIG. 23)

Figure 24:
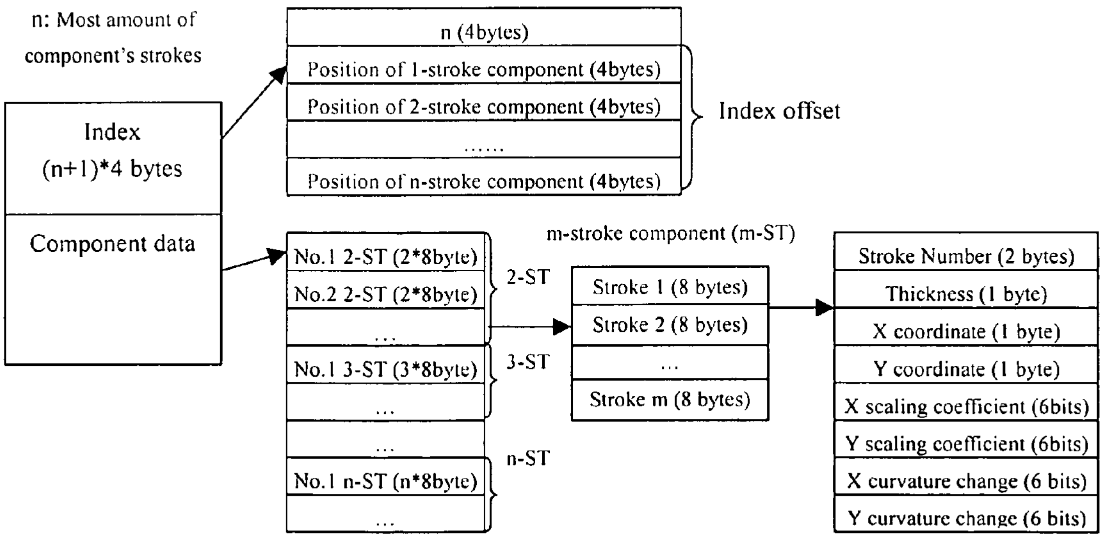
FIG. 24 shows component parameters data format of component-composed characters.

Component parameter data (see FIG. 24)

Figure 25:
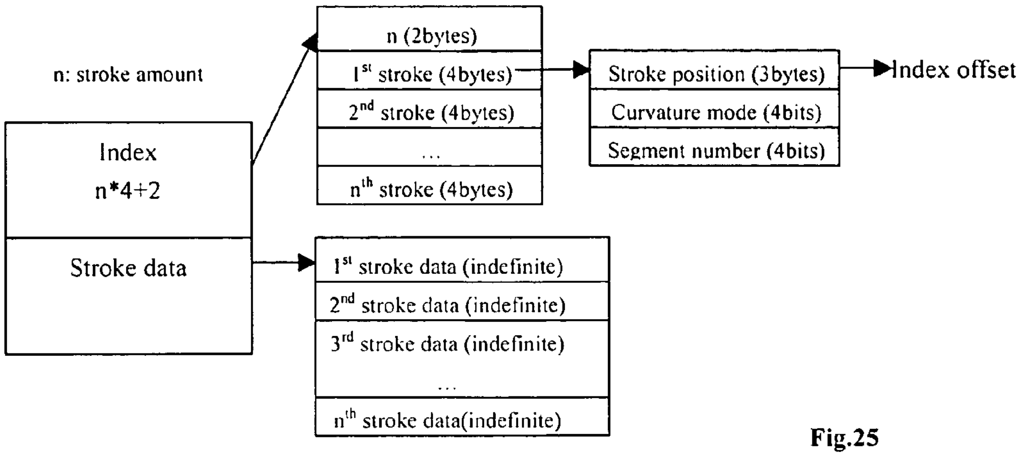
FIG. 25 shows stroke parameters data format of component-composed characters.

Stroke data (see FIG. 25)

2.5. Format of Part Shared Multi-Font Component-Composed Characters

Figure 22:
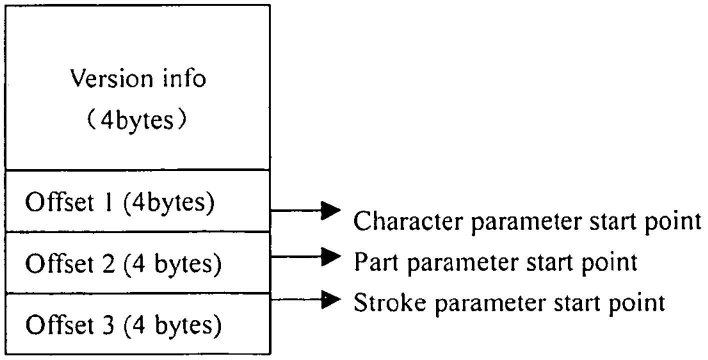
FIG. 22 shows component-composed characters index.

Other font files are mainly composed of index table, character parameter data, component parameter data, and stroke data. The data formats in detail are described as following:

Index table (see FIG. 22)

Character parameter data (see FIG. 26)

Component parameter data (see FIG. 27)

Stroke data (see FIG. 28)

3. The Mathematical Model and its Font Generator Device 3.1. Coordinate System and Transforming Formula ZGX font library uses following coordinate systems: device coordinate system (relative to printer or other devices), character coordinate system, component coordinate system and stroke coordinate system.

(1) Device Coordinate System

Figure 29:
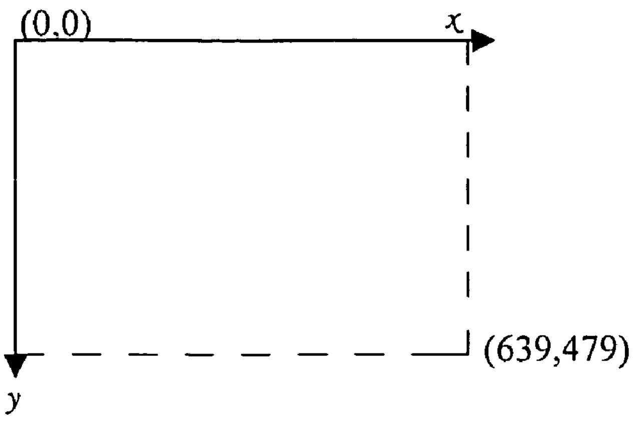
FIG. 29 shows a compute screen coordinate system.

Take computer's monitor as an example, the definition of the screen is as FIG. 29.

The origin of the screen is (0,0) at the top left corner. The Y-axis is down, and the X-axis is rightward. The resolution of VGA is 640*480, so the coordinates of the bottom right corner is (639,479).

(2) Character Coordinate System

Figure 30:
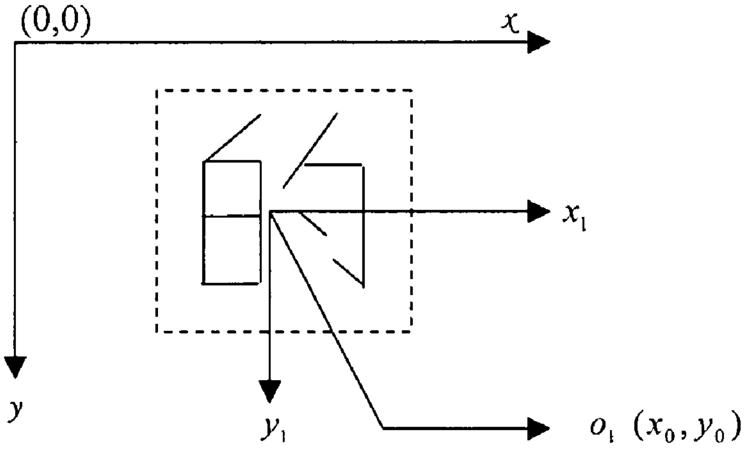
FIG. 30 shows a character coordinate system.

In FIG. 30, $x_1o_1y_i$ is the coordinate system, and xoy is the device coordinate system. The center of the character is in the device coordinate system. To display a character, the following data are needed: the number of the character, the scaling coefficients in X direction and Y direction (the resolution of the reference character is 256*256) and the coordinates of the character's center $o_1(x_0, y_0)$ (this point is the origin $o_1$ of the character coordinate system's center). Then the character can be displayed right in the given position.

(3) Component Coordinate System

Figure 31:
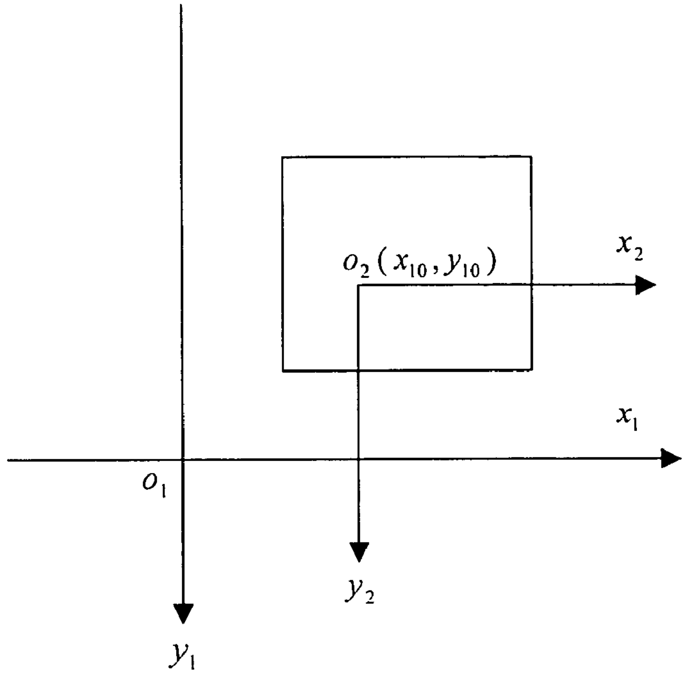
FIG. 31 shows a character component coordinate system.

In FIG. 31, $x_2o_2y_2$ is the component coordinate system, relative to character coordinate system. And $o_2$ is the center of a component. Every component has a component coordinate system relative to character coordinate system. Displaying a character is realized by displaying several components. To display a character, it is needed to read the number of each component, the scaling coefficients in X and Y directions, and the relative coordinates $(x_{10}, y_{10})$ of $o_2$.

(4) Stroke Coordinate System

Figure 32:
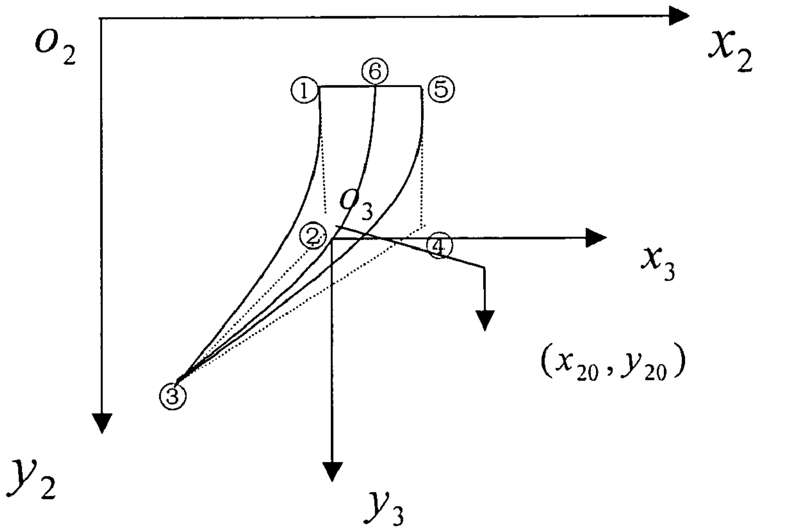
FIG. 32 shows a stroke coordinate system.

In FIG. 32, $x_3o_3y_3$ is the stroke coordinate system, relative to component coordinate system $x_2oy_2$. Generating a component is realized by displaying several strokes. To generate a component, it is needed to read number of each stroke, the scaling coefficients in X and Y directions, and the relative coordinates $(x_{20}, y_{20})$ of $o_3$ in $x_2o_2y_2$ coordinate system. Also, every stroke has a stroke coordinate system. How to generate a stroke? In the stroke coordinate system, the stroke is gained by filling algorithm according to the stroke's coordinates and curve fitting parameters (read from stroke file according to the number of the stroke).

(5) Fitting of Second-Order Bezier Curve

It is shown in FIG. 32. The short Pie is divided into three segments, and every segment uses a fitting of second-order Bezier curve.

The first segment uses the coordinates of ①, ②, and ③. The ② is the point of intersection of the tangents of ① and ③).

The second segment uses the coordinates of ③, ④, and ⑤. The ④ is the point of intersection of the tangents of ③ and ⑤.

The second segment uses the coordinates of ⑤, ⑥, and ①. The ⑥ is the point of intersection of the tangents of ⑤ and ①.

If curve from ① to ③ is a line, than ② can be any point on the line.

The formula is as following:

$$x(t) \quad x_1(1 \quad t^2) \quad 2t(1 \quad t)x_2 \quad t^2x_3 \qquad (1)$$

wherein, $t$ 0, 1

$$y(t) \quad y_1(1 \quad t^2) \quad 2t(1 \quad t)y_2 \quad t^2y_3 \qquad (2)$$

In the formula, $(x_1, y_1)$, $(x_2, y_2)$ and $(x_3y_3)$ are respective the coordinates of the head point, the middle point and the end point.

Thus, it is only needed to save the relative coordinates of ① to ⑥ points for Bezier curve fitting. The data format is the same as that of broken line, but the difference is the record of coordinates of even points. And the point is the intersection of the tangents of ore-and-aft two points.

(6) Coordinates Transform of Generating a Character in a Device

The transform formulas for coordinate points on every stroke of every component from character coordinate system to device coordinate system are:

$$X_{kij}((X_{2i}S_{xBi}X_{3j}128)B_{xk}128X_{k_1})Z_{xs}128X_0$$

$$Y_{kij}((Y_{2i}S_{yBi}Y_{3j}128)B_{yk}128Y_{k_1})Z_{ys}128Y_0$$

Where, $X_{kij}$, $Y_{kij}$ denotes coordinates of the ith stroke in the character coordinate system;

$Z_{xs}$, $Z_{ys}$ denotes scaling coefficients of the character;

$X_0$, $Y_0$ denotes character's coordinates in the screen coordinate system;

$X_{3j}$, $Y_{3j}$ denotes the ith stroke's coordinates in the stroke coordinate system;

$X_{k1}$, $Y_{k1}$ denotes coordinates of the kth component's center in the character coordinate system;

$B_{xk}$, $B_{yk}$ denotes scaling coefficients of the kth component's center in X and Y directions;

$X_{2i}$, $Y_{2i}$ denotes coordinates of the kth component's ith stroke's center in the character coordinate system;

$S_{xBi}$, $S_{yBi}$ denotes scaling coefficients of the kth component's ith stroke in X and Y directions;

k=1 to the amount of components of the character;

i=1 to the amount of strokes of the kth component;

j=1 to the amount of points of the kth component's ith stroke;

in case of k=1, the character is composed of strokes directly, and the formula above described is used for the coordinate transform when constructing character by strokes.

3.2. ZGX Font Generator Device

The flow chart of the module is as following:

(1) The flow chart of main module, as shown in Steps 110-120 of FIG. 1.

Figure 2:
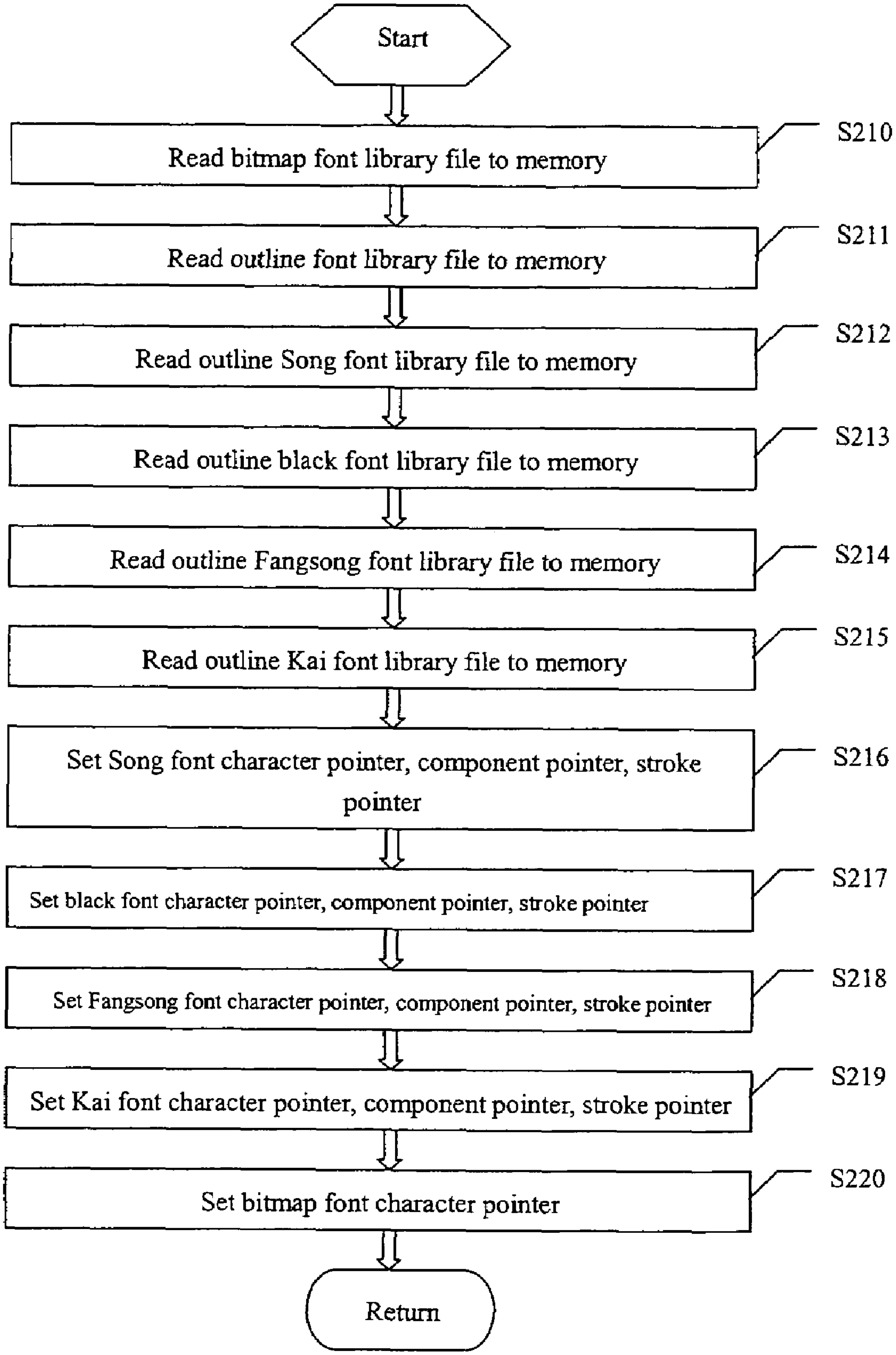
FIG. 2 is a flow chart of reading in font lib data files.

(2) Read font library data into memory array, as shown in Steps 210-220 of FIG. 2.

Figure 3:
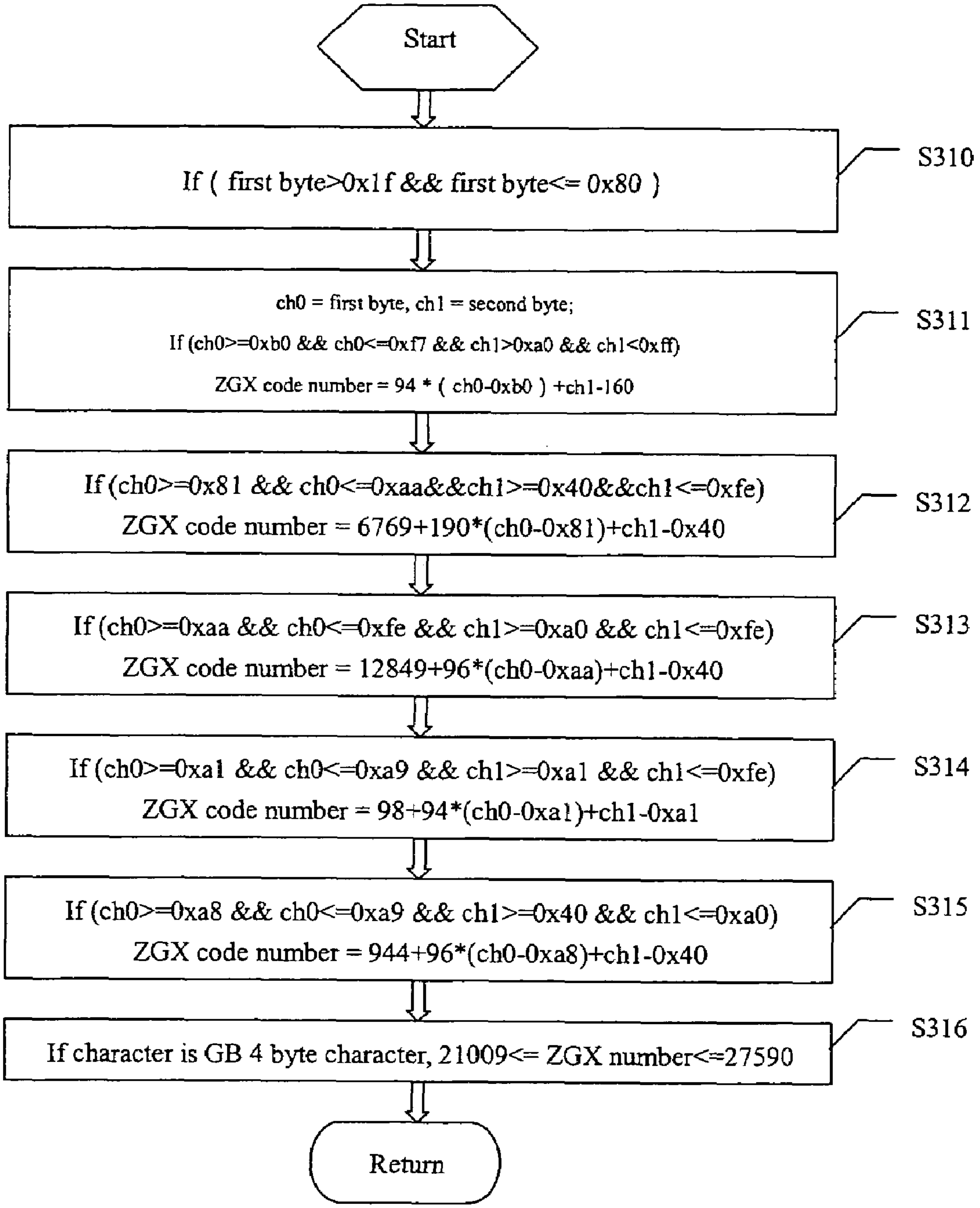
FIG. 3 shows a process of Changing from Standard code/UNICODE to ZGX.

(3) Transform Chinese Standard code (or Unicode code) into character number of ZGX font library, as shown in Steps 310-316 of FIG. 3.

(4) Generate Stroke-composed character according to the character number of ZGX font library, as shown in Steps 410-414 of FIG. 4.

(5) Generate Component-composed character according to the character number of ZGX font library, as shown in FIG. 1.

(6) The flow chart of stroke generator, as shown in Steps 510-524 of FIG. 5.

Figure 6:
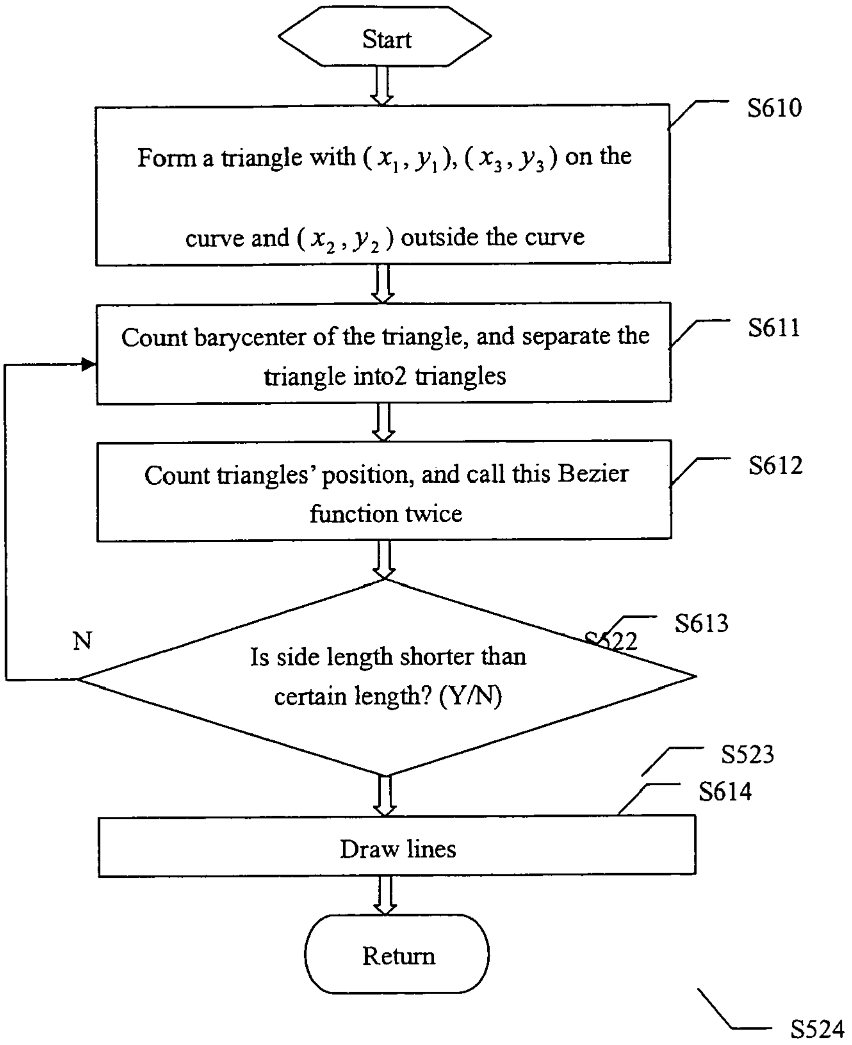
FIG. 6 shows a flow chart of Bezier lines generator module.

(7) Recursive call module of Bezier curve, as shown in Steps 610-614 of FIG. 6.

Figure 7:
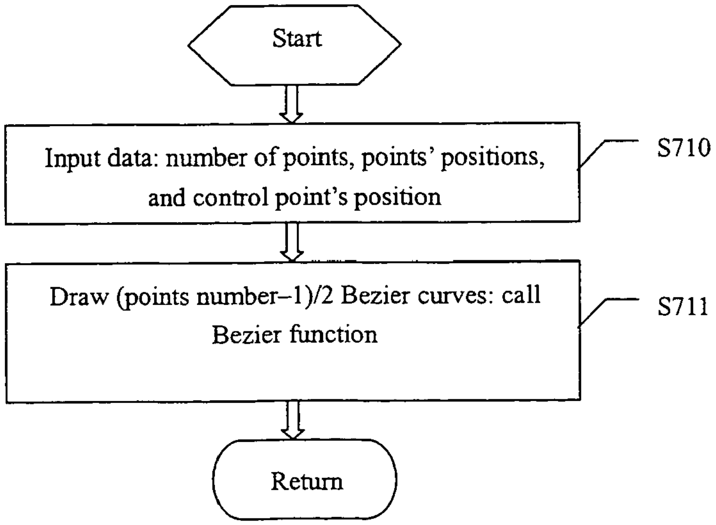
FIG. 7 is a flow chart of generating a stroke by one or more Bezier line(s)

(8) The sub-module of generating a stroke segment with one or more Bezier curve is shown in Steps 710-711 of FIG. 7.

Figure 8:
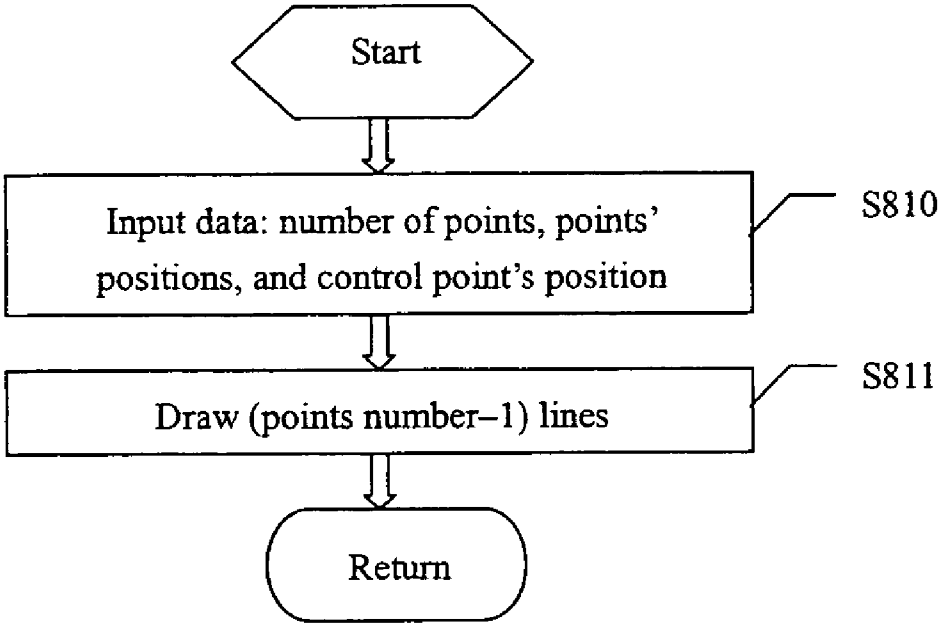
FIG. 8 is a flow chart of generating a stroke by one or more Beeline(s)

(9) The sub-module of generating a stroke segment with one line or more, as shown in Steps 810-811 of FIG. 8.

Figure 9:
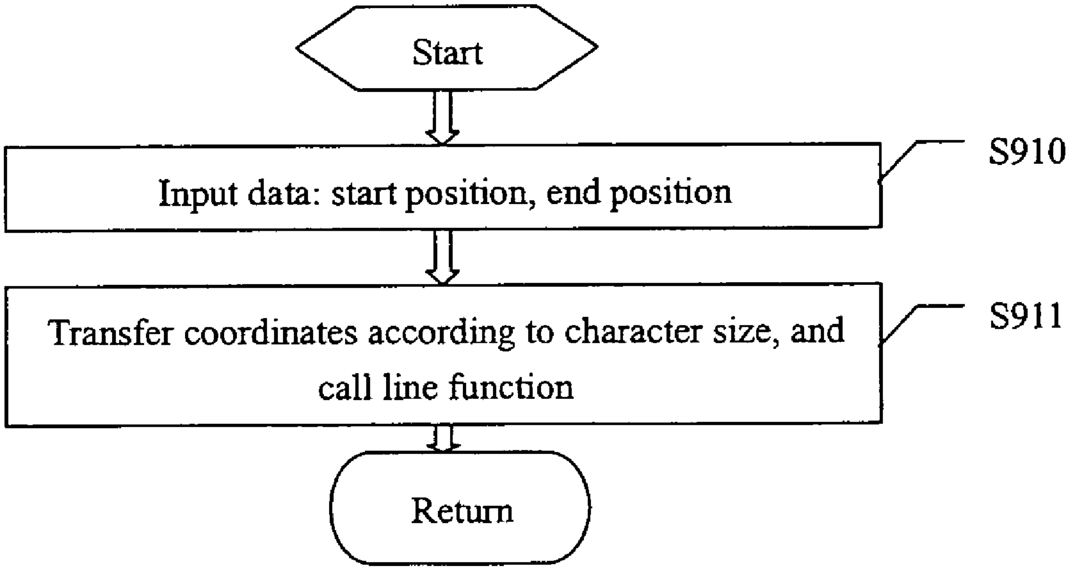
FIG. 9 is a flow chart of Beeline transfer sub-module.

(10) The sub-module of transforming line, as shown in Steps 910-911 of FIG. 9.

Figure 10:
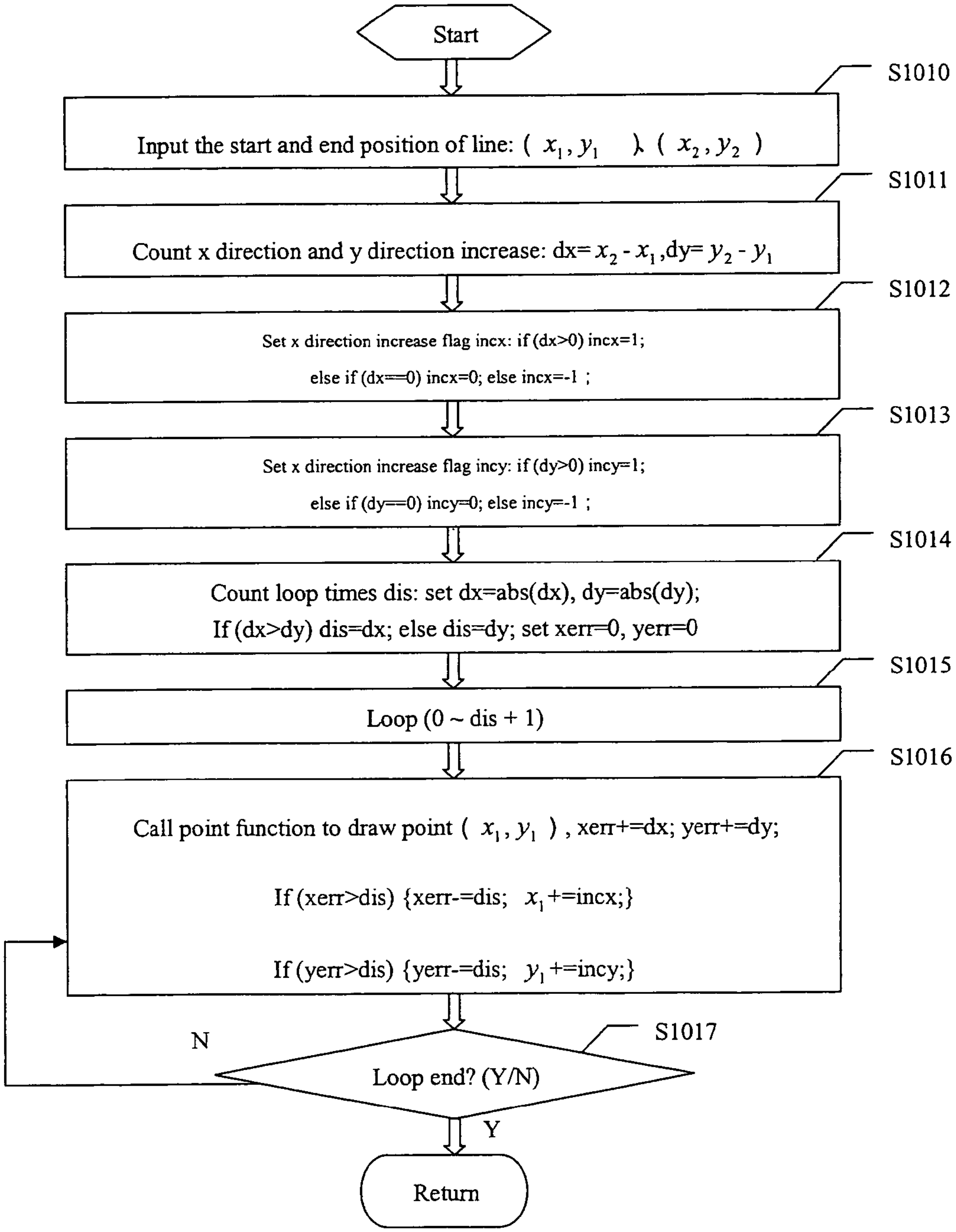
FIG. 10 is a flow chart of Beeline sub-module.

(11) The sub-module of drawing line, as shown in Steps 1010-1017 of FIG. 10.

Figure 11:
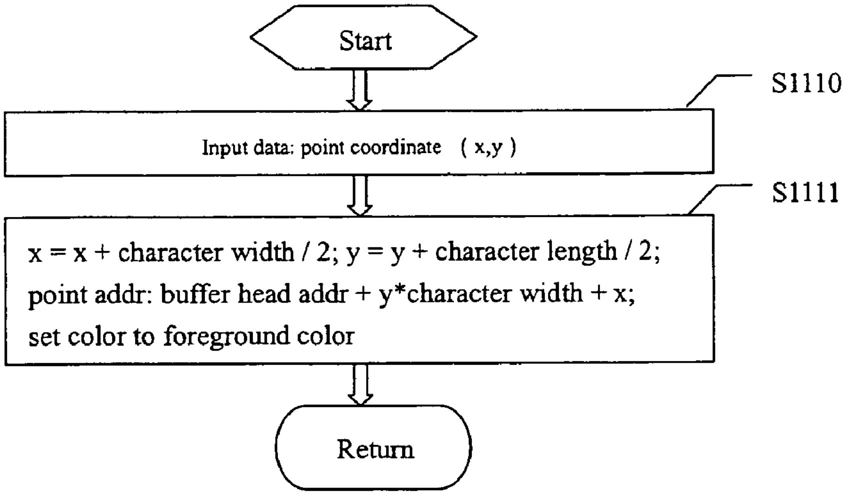
FIG. 11 is Sub-module of drawing bitmaps in buffer.

(12) The sub-module of drawing bitmap in buffer, as shown in Steps 1110-1111 of FIG. 11.

Figure 12:
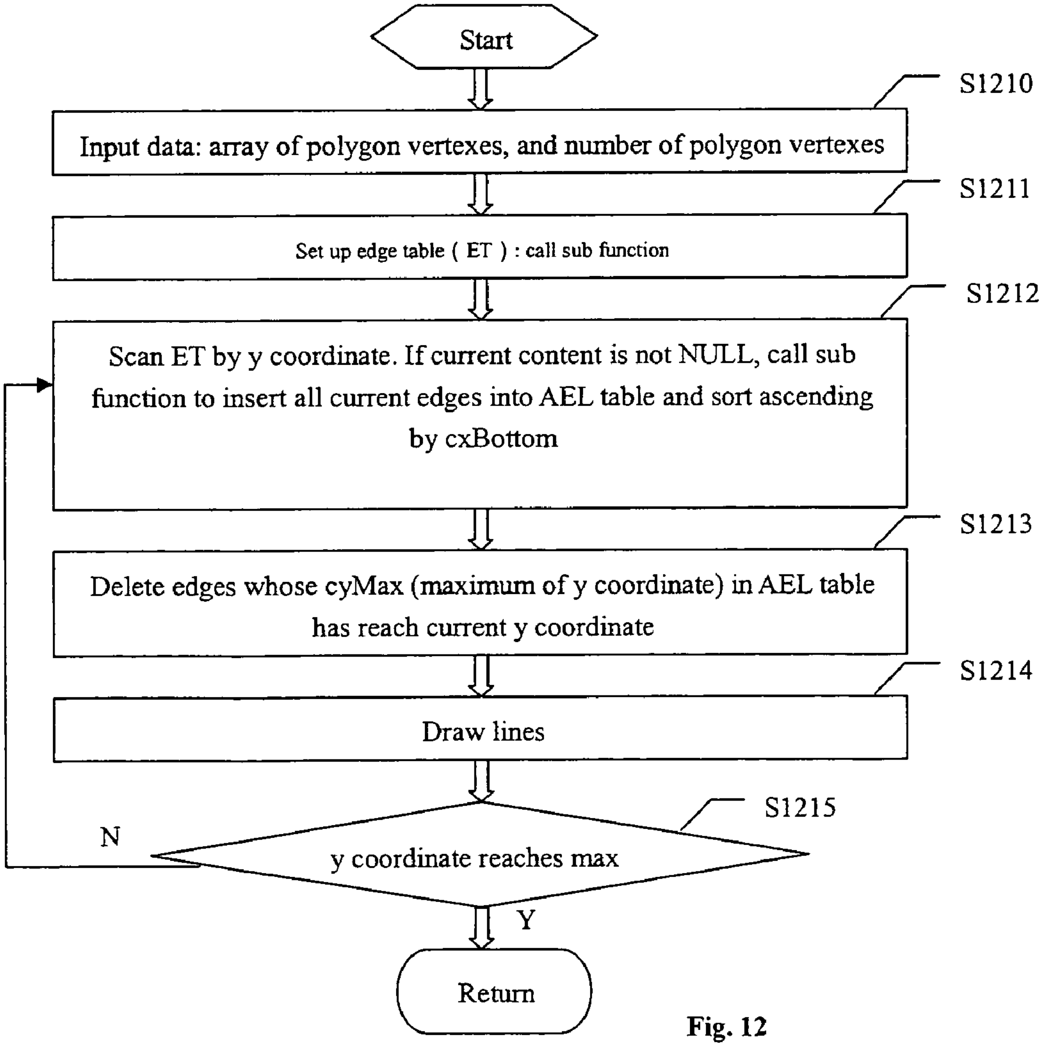
FIG. 12 is a flow chart of Fill-in sub-module.

(13) The sub-module of filling algorithm, as shown in Steps 1210-1215 of FIG. 12.

Figure 13:
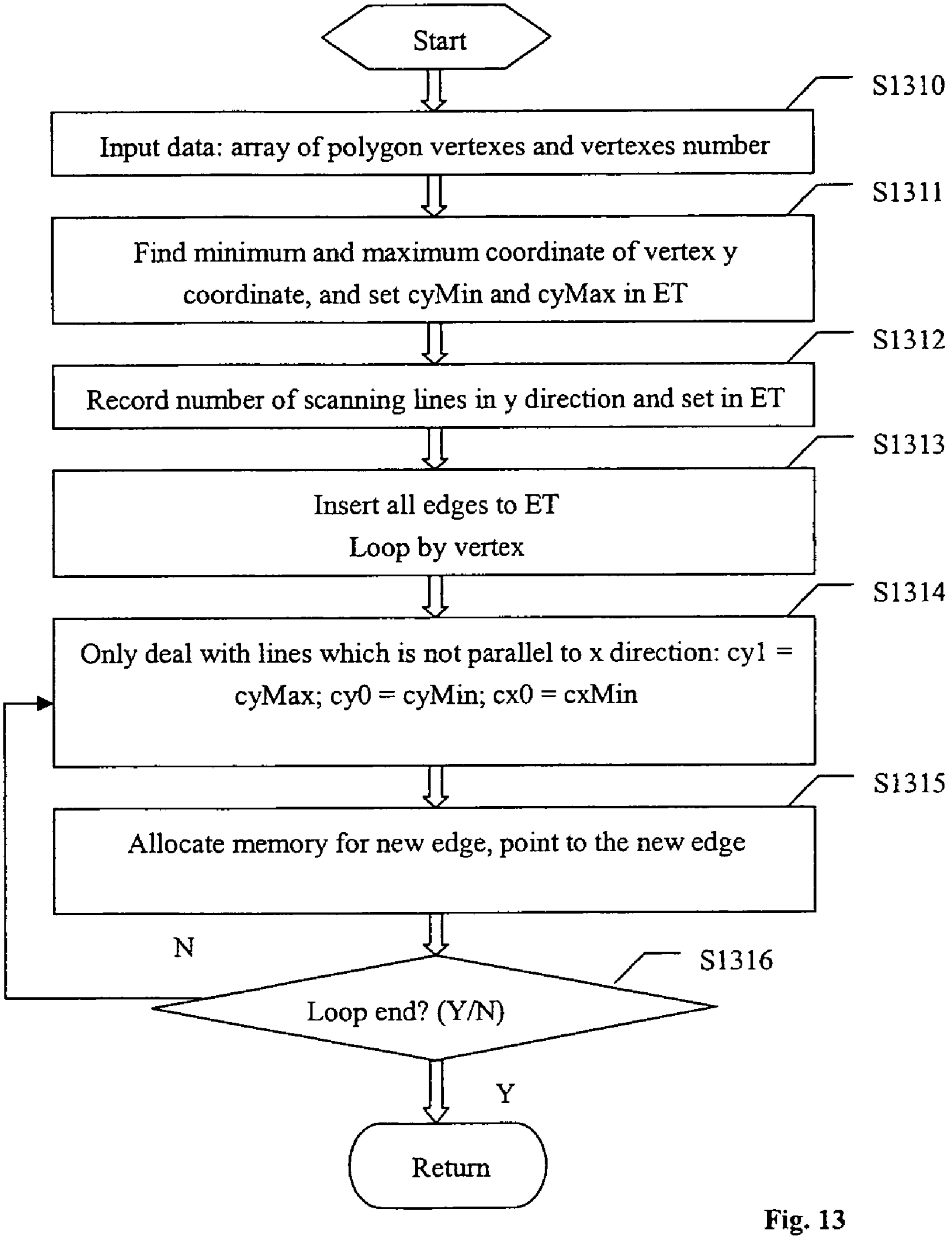
FIG. 13 is a flow chart of E table sub-module.

(14) The sub-module of edge table (ET) of edges, as shown in Steps 1310-1316 of FIG. 13.

Figure 14:
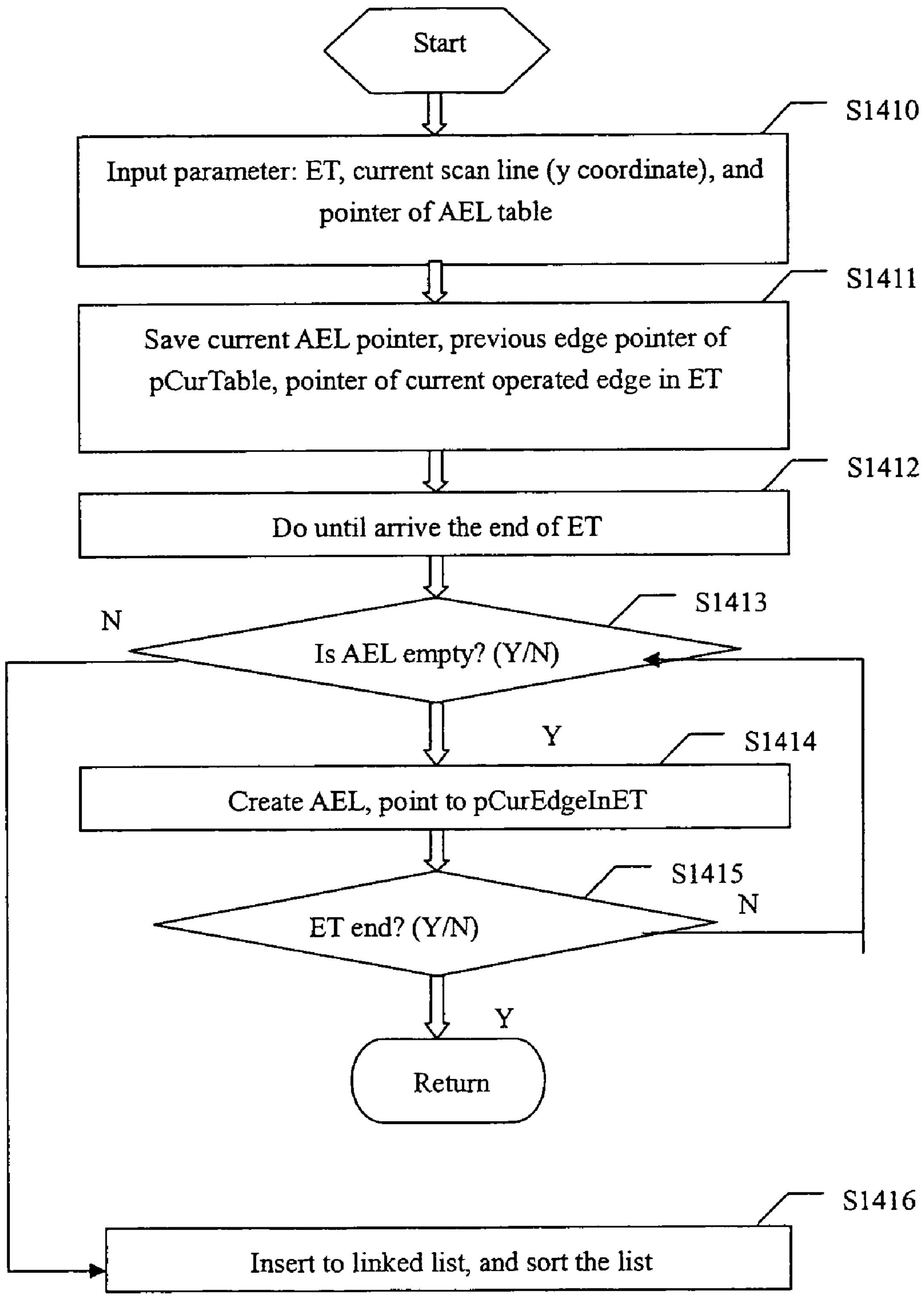
FIG. 14 is a flow chart of CXBOTOOM sort ascending sub module.

(15) Insert all edges of one item from ET of edges into active edge table (AEL) in ascending order by cxBottom, as shown in Steps 1410-1416 of FIG. 14.

4. ZGX Font Library Call Interface Device 4.1. Data Structure Definition (1) Return Pointer Array of Font Initialization

```
typedef struct fhzz
{
long*zys;
long*zics;
long*zrcs;
long*bhcs;
}fhzz,far*lpfhzz;
```

zys: data pointer of character index parameter;

zics: data pointer of character parameter for font;

zrcs: data pointer of component parameter for font;

zhcs data pointer of stroke parameter for font.

(2) Revivification Array of (Chinese) Character

```
typedef struct hzfycs
{
unsigned char zhd;
unsigned char zkd;
unsigned char zcd;
unsigned char zys;
unsigned char zfs;
}hzfycs,far*lphzfycs;
```

zhd: the thickness parameter of Chinese character, 1 Byte, its standard value is 32;

zkd: the width parameter of Chinese character, 1 Byte, using pixel as unit;

zcd: the length parameter of Chinese character, 1 Byte, using pixel as unit;

zys: the color or grayscale of Chinese character, 1 Byte;

zfs: the display mode parameter of Chinese character, 1 Byte.

The definition of parameter value is as following:

The first two bits denote the rotation mode: 00 means the routine (no rotation), 01 means 90 degree rotation, 10 means 180 degree rotation, 11 means 270 degree rotation.

The third bit denotes the bold or not: 0 means routine, 1 means bold.

The fourth bit denotes the italic or not: 0 means routine, 1 means italic.

The fifth bit denotes that it is underlined or not: 0 means routine, 1 means underline.

The sixth and seventh bits denote the filling mode of Chinese character: 00 means only drawing centerline i.e. single line character, 01 means filling Chinese character by 'OR' mode, 10 means filling Chinese character by 'AND' mode, 11 means filling Chinese character by 'XOR' mode.

The eighth bit denotes the display mode of character: 0 means DBC case, 1 means SBC case, 1 means Chinese character.

4.2. Initialization of Font (1) Interface Module

Hz_S (zth, lpfhzz);

zth: font size, character parameter, these are entrance parameters;

The definitions of parameters are as following:

0: 16*16 bitmap font library according to GB-2312 standard;

1: Outline font library of Songti (Chinese) font according to GB18030-2000 standard;

2: Outline font library of Heiti (Chinese) font according to GB18030-2000 standard;

3: Outline font library of Fangsongti (Chinese) font according to GB18030-2000 standard;

4: Outline font library of Kaiti (Chinese) font according to GB18030-2000 standard;

5: Outline font library of special characters according to GB18030-2000 standard;

6: . . .

Lpfhzz: return parameter, pointer of pointer array.

(2) Realization Method

Open file according to the size of font, for example, the name of GB2312 16*16 font library file is DW16D, the name of GB18030-2000 Songti outline font library file is DWSTQ, the name of GB-2312 Heiti outline font library file is DWHTQ, and the name of special character font library file is DWQZFK.

Twelve memory array are defined respectively as GB-2312 16*16 bitmap font array, index parameter array of GB18030-2000 Songti outline font library, character parameter array of Songti font, Songti component parameter array and Songti stroke parameter array; character index parameter array of Heiti outline font library, character parameter array of Heiti font, Heiti component parameter array and Heiti stroke parameter array; parameter arrays of Fangsong, Kaiti, and special character etc.

Read file data according to the font into corresponding array;

Return the pointer of each array.

4.3. Revivification of Chinese Characters (1) Interface Module

HZ_X(hz$,zth,hzfycs,fclx,zbuf);

Hzh: size of font;

hz$: the Chinese standard code of a Chinese character, usually 2 bytes;

hzfycs: the revivification parameter array of Chinese character, 5 bytes;

Fclx: the type of a return parameter, 0 denotes bitmap, 1 denotes outline or vector array, 2 denotes TTF data format, 3 denotes PS data format;

Zbuf: bitmap of returned Chinese character or other data buffer pointer; this is a returned parameter.

The storage mode of Chinese character bitmap is that every pixel takes 1 bit, every character takes [((zkd*zcd)+7)/8] bytes.

(2) Realization Method

Find the corresponding array pointer according to the size of font;

Calculate the size of Chinese characters according to the inner code. The formula for calculation is as following:

Suppose the higher byte of the inner code is C1, and the lower byte is C2 (C1, C2 are the integer with no sign). If C1=0, then go to DBC case process.

If hz$ is in the range of character code, i.e. the Chinese standard code is between 0X1F and 0X80, A1A1-A1Fe and A9A1-A9FE, A840-A87E and A880-A8FE and A940-A97E and A980-A9FE (total amount is 1136), the character font library DWQZFK will be called. Outline font library uses two steps to generate Stroke-composed characters. The module of stroke revivification needn't to be modified. It is only needed to modify the called outline font library file, process the structure file of the character, and calculate the order number ZH of the character in the font library according to the code:

```
if(hz$>=0x1f && hz$<=0x80) ZH=hz$−0x1f;
else if(c0>=0xa1 && c0<=0xa9 && c1>=0xa1 && c1<=0xfe)
ZH=99+(c0−0xa1)*94+c1−0xa1;
else if(c0>=0xa8 && c0<=0xa9 && c1>=0x40 && c1<=0xa0)
{
ZH=945+(c0−0xa8)*96+c1−0x40;
if(c1>0x7f) ZH--;
}
```

Else go to the corresponding font file for Chinese font library, and do the following process:

If C1>=0XB0 and C1<=0XF7 and C2>=0XA1, then character number=(C1−176)*94+C2−161;

If C1>=0X81 and C2<=0XA1: if C2>=0X7F, then C2--, character number=(C1−176)*94+C2−64+6768;

If C1>=0XAA and C2<=0XA1: if C2>=0X7F, then C2--, character number=(C1−170)*96+C2−64+12848;

The number of four-byte character is between 21008 and 27589.

The data describing the character are found according to the character number;

If the character is a 16*16 bitmap font character, then the data pointer of the character is: bitmap font data pointer+(character number−1)*32;

If the character is an outline font character, then its character parameter data will be found according to character index file and character number, then the component parameter data will be found according to the character parameter data, and finally the stroke data will be found according to each component parameter data.

The coordinates of each stroke are calculated.

The drawing stroke sub-module is called.

The drawing stroke sub-module calls drawing line sub-module and drawing Bezier curve sub-module. In the end, the filling module is called.

Additionally, there are rotation, bold, underline, and italic modules.

(3) Design

An interface module, a drawing stroke sub-module, a drawing line sub-module, a drawing Bezier curve module and a filling sub-module are required by design.

The stroke drawing line sub-module and the filling sub-module need to be realized in buffer.

The calculating of the character drawing control is on the 256*256 rectangle. It is scaled when drawing centerline and outline (firstly, both the length and width of the character are 256; when drawing centerline and outline of the stroke, the following calculating is applied: X coordinate relative to the character's center*character's width/256, Y coordinate relative to the character's center*character's length/256).

Return the bitmap, vector outline, TTF format or PS format of the character.

Fault tolerance: All characters can be displayed at any resolution without error, distortion and beyond the limits.

4.4. Display of Character String (1) Interface Module

HZ_C(hzc$,zth,zxx,zyy,hzfycs);

Hzh: size of font;

hzc$: the code string of a Chinese character or a set of characters;

Zxx: the X coordinate of the displaying character string in the top left corner;

Zyy: the Y coordinate of the displaying character string in the top left corner;

hzfycs: the revivification parameter array of characters, 5 bytes.

What is claimed is:

1. A Chinese character displaying method comprising the steps of:

reading parameterized reference stroke data of a Chinese character, the parameterized reference stroke data represent coordinates under a stroke coordinate system and comprise data of drawing centerline segments and data of drawing outline segments;

transforming the coordinates under stroke coordinate system into data under a component coordinate system by using first external calling parameters, the first external calling parameters comprising thickness of stroke, scaling coefficients of stroke, coordinates of stroke center under the component coordinate system and curvature change parameter;

transforming data under the component coordinate system into a data character coordinate system by using second external calling parameters, the second external calling parameters comprising thickness of component, scaling coefficients of component, and coordinates of component center under the character coordinate system;

transforming data under the character coordinate system into data under a screen coordinate system by using third external calling parameters, the third external calling parameters comprising length of character, width of character, scaling coefficients of character, coordinates of character center under screen coordinate system, foreground and background colors for character displaying, and memory array pointer of a font bitmap; and displaying, on the basis of the data under the screen coordinate system, the character by drawing outline of the character.

2. The Chinese character displaying method of claim 1, wherein the step of displaying the character comprises:

displaying, on the basis of the data under screen coordinate system, each stroke of the component so as to display the component.

3. The Chinese character displaying method of claim 2, wherein the step of displaying the character further comprises:

displaying the character by displaying each component of the character.

4. A Chinese character displaying method comprising the steps of:

reading parameterized reference stroke data of a Chinese character, the parameterized reference stroke data representing coordinates under a stroke coordinate system and comprising data of drawing centerline segments and data of drawing outline segments;

transforming the coordinates under the stroke coordinate system into data under a character coordinate system by using first external calling parameters, the first external calling parameters comprising thickness of stroke, scaling coefficients of stroke, coordinates of stroke center under the character coordinate system and curvature change parameter;

transforming data under the character coordinate system into data under a screen coordinate system by using second external calling parameters, the second external calling parameters comprising length of character, width of character, scaling coefficients of character, coordinates of character center under the screen coordinate system, foreground and background colors for character displaying, and memory array pointer of font's bitmap; and displaying, on the basis of the data under the screen coordinate system, the character by drawing outline of the character.

5. The Chinese character displaying method of claim 4, wherein the step of displaying the character comprises:

displaying, on the basis of the data under screen coordinate system, each stroke of the component so as to display the character.

* * * * *